US006844058B2

(12) United States Patent
Blum et al.

(10) Patent No.: US 6,844,058 B2
(45) **Date of Patent: *Jan. 18, 2005**

(54) FLOOR MAT INCLUDING TACKY SURFACE WITH TACKY-WHEN-DRY AND TACKY-WHEN-WET PROPERTIES

(75) Inventors: Ronald D. Blum, Roanoke, VA (US); Bradley J. Blum, Roanoke, VA (US); Dwight P. Duston, Laguna Niguel, CA (US); William Kokonaski, Gig Harbour, WA (US); Peter W. Kopf, Sudbury, MA (US)

(73) Assignee: Tech Mats, LLC, Roanoke, VA (US)

(*) Notice: Subject to any disclaimer, the term of this patent is extended or adjusted under 35 U.S.C. 154(b) by 151 days.

This patent is subject to a terminal disclaimer.

(21) Appl. No.: 09/985,456

(22) Filed: Nov. 2, 2001

(65) Prior Publication Data

US 2002/0068147 A1 Jun. 6, 2002

Related U.S. Application Data

(63) Continuation-in-part of application No. 09/553,234, filed on Apr. 19, 2000, now Pat. No. 6,233,776, which is a continuation-in-part of application No. 09/418,752, filed on Oct. 15, 1999, now abandoned, which is a continuation-in-part of application No. 09/304,051, filed on May 4, 1999, now Pat. No. 6,219,876.

(60) Provisional application No. 60/246,602, filed on Nov. 8, 2000.

(51) Int. Cl.[7] ............................ B32B 27/04; B32B 7/12

(52) U.S. Cl. ..................... 428/343; 428/40.1; 428/41.7; 428/42.2; 428/43; 428/46; 428/47; 428/52; 428/53; 428/54; 428/55; 428/56; 428/57; 428/58; 428/74; 428/77; 428/98; 428/101; 428/119; 428/131; 428/156; 428/167; 15/104.002; 15/215

(58) Field of Search ............................ 15/104.002, 215, 15/216; 428/40.1, 41.7, 42.2, 43, 46, 47, 52, 53, 54–58, 74, 77, 98, 101, 119, 195, 131, 343

(56) References Cited

U.S. PATENT DOCUMENTS

| | | | |
|---|---|---|---|
| 2,191,704 A | 2/1940 | Bennett | |
| 2,254,830 A | 9/1941 | Schloss | 4/185 |
| 2,282,672 A | 5/1942 | Nelson | |

(List continued on next page.)

FOREIGN PATENT DOCUMENTS

| | | |
|---|---|---|
| DE | 26 39 289 | 3/1978 |
| DE | 299 11 216 | 12/1999 |
| DE | 200 18 166 | 4/2001 |
| EP | 0 009 891 A1 | 4/1980 |

(List continued on next page.)

OTHER PUBLICATIONS

U.S. Appl. No. 09/928,429, filed Aug. 14, 2001, Kokonaski et al.

(List continued on next page.)

*Primary Examiner*—Arti R. Singh
(74) *Attorney, Agent, or Firm*—Kenyon & Kenyon

(57) ABSTRACT

An advanced floor mat is disclosed. In an embodiment of the present invention, the floor mat includes a cleanable portion. The floor mat may also include a water dissipation component, a water absorbing component, a cushioning component, customized graphics, a transparent cleanable portion, a tacky surface on the cleanable portion, an anti-bacterial composition, an antifungal composition, and a fragrance. The cleanable portion may be erodible and may include a plurality of cleanable reusable layers. If a tacky surface is included in the floor mat, an anti-slip feature may be associated with the tacky surface to help prevent slipping on a possibly wet tacky surface. The tacky surface may comprise a material with a dual chemistry such that the tacky surface is tacky both when dry and when wet. Additionally, a sensor system may be included in the floor mat to assist a user in identifying when the floor mat may require cleaning.

52 Claims, 21 Drawing Sheets

U.S. PATENT DOCUMENTS

| | | | | | |
|---|---|---|---|---|---|
| 2,512,310 | A | | 6/1950 | Corson | |
| 2,800,215 | A | | 7/1957 | Converse | |
| 2,843,868 | A | | 7/1958 | Borgstron | 15/215 |
| 2,919,456 | A | | 1/1960 | Spivey | 15/215 |
| 3,038,393 | A | | 6/1962 | Nappi | 15/215 |
| 3,078,490 | A | | 2/1963 | Etcher | 15/216 |
| 3,141,522 | A | | 7/1964 | Fitzpatrick | 184/106 |
| 3,183,116 | A | | 5/1965 | Schaar | |
| 3,300,275 | A | | 1/1967 | Lorman | |
| 3,400,421 | A | | 9/1968 | Nappi | 15/215 |
| 3,435,481 | A | | 4/1969 | Kessler | 15/215 |
| 3,501,797 | A | | 3/1970 | Nappi | 15/215 |
| 3,517,407 | A | | 6/1970 | Wyant | 15/215 |
| 3,578,738 | A | | 5/1971 | Hughes | 15/215 |
| 3,663,980 | A | | 5/1972 | Conklin | 15/215 |
| 3,665,543 | A | | 5/1972 | Nappi | 15/215 |
| 3,696,459 | A | | 10/1972 | Kucera et al. | 15/104.92 |
| 3,699,926 | A | | 10/1972 | Stocki | 15/215 |
| 3,717,897 | A | | 2/1973 | Amos et al. | 15/215 |
| 3,785,102 | A | | 1/1974 | Amos | 52/173 |
| 3,886,620 | A | | 6/1975 | Miller | 15/217 |
| 3,906,578 | A | | 9/1975 | Huber | 15/104.002 |
| 3,909,996 | A | | 10/1975 | Ettlinger, Jr. et al. | 52/177 |
| 4,068,339 | A | | 1/1978 | Maruyama et al. | |
| 4,107,811 | A | | 8/1978 | Imsande | 15/215 |
| 4,126,854 | A | | 11/1978 | Sheridon | |
| 4,143,103 | A | | 3/1979 | Sheridon | |
| 4,143,194 | A | | 3/1979 | Wihksne | 428/81 |
| 4,720,789 | A | | 1/1988 | Hector et al. | 364/410 |
| 5,114,774 | A | | 5/1992 | Maxim, Jr. | |
| 5,316,817 | A | | 5/1994 | Timperley | 428/78 |
| 5,562,580 | A | | 10/1996 | Beasley et al. | 493/94 |
| 5,571,626 | A | | 11/1996 | Cumming et al. | |
| 5,589,246 | A | | 12/1996 | Calhoun | 248/120 |
| 5,604,027 | A | | 2/1997 | Sheridon | |
| 5,658,637 | A | | 8/1997 | Volz | 428/95 |
| 5,723,204 | A | | 3/1998 | Stefik | |
| 5,815,995 | A | | 10/1998 | Adam | 15/215 |
| 5,826,874 | A | | 10/1998 | Teitell et al. | 473/225 |
| 5,839,976 | A | | 11/1998 | Darr | 473/414 |
| 5,869,350 | A | | 2/1999 | Heeger et al. | |
| 5,919,540 | A | | 7/1999 | Bailey | 428/67 |
| 5,945,502 | A | | 8/1999 | Hsieh et al. | |
| 5,997,995 | A | | 12/1999 | Scianna | |
| 6,001,456 | A | | 12/1999 | Newland | |
| 6,088,984 | A | | 7/2000 | Kirby | |
| 6,219,876 | B1 | * | 4/2001 | Blum | 15/215 |
| 6,233,776 | B1 | * | 5/2001 | Blum et al. | 15/215 |
| 6,458,442 | B1 | | 10/2002 | McKay | |
| 6,541,098 | B2 | * | 4/2003 | Venkatasanthanam et al. | 428/161 |
| 2003/0135947 | A1 | * | 7/2003 | McKay | 15/215 |

FOREIGN PATENT DOCUMENTS

| | | | |
|---|---|---|---|
| EP | 0 188 005 | B2 | 7/1986 |
| EP | 0 199 537 | B1 | 10/1986 |
| EP | 0 202 846 | B1 | 11/1986 |
| EP | 0 353 139 | | 1/1990 |
| EP | 0 354 281 | A1 | 2/1990 |
| EP | 0 359 478 | A2 | 3/1990 |
| EP | 0 365 869 | A1 | 5/1990 |
| EP | 0 374 860 | A3 | 6/1990 |
| EP | 0 448 768 | A1 | 10/1991 |
| EP | 0 514 191 | A1 | 11/1992 |
| EP | 0 554 641 | A1 | 8/1993 |
| EP | 0 573 277 | A1 | 12/1993 |
| EP | 2 268 399 | | 1/1994 |
| EP | 0 624 125 | B1 | 11/1994 |
| EP | 0 624 681 | A2 | 11/1994 |
| FR | 2 761 255 | A | 10/1998 |
| GB | 2 054 369 | | 2/1981 |
| JP | H8-228992 | | 9/1996 |
| JP | 08-239988 | | 9/1996 |
| JP | 11-109901 | | 4/1999 |
| JP | 2000-322009 | | 11/2000 |
| JP | 2001-306096 | | 2/2001 |
| TW | ROC 51781 | | 1/1983 |
| TW | ROC 328711 | | 3/1998 |
| TW | ROC 394679 | | 6/2000 |
| WO | WO 88/03383 | | 5/1988 |
| WO | WO 96 38298 | A | 12/1996 |
| WO | WO 00 65890 | A | 11/2000 |

OTHER PUBLICATIONS

U.S. Appl. No. 09/935,672, filed Aug. 24, 2001, Blum et al.
U.S. Appl. No. 10/316,030, filed Dec. 11, 2002, Blum et al.
U.S. Appl. No. 10/395,793, filed Mar. 25, 2003, Blum et al.
U.S. Appl. No. 10/436,245, filed May 13, 2003, Blum et al.
U.S. Appl. No. 10/631,895, filed Aug. 1, 2003, Blum et al.
U.S. Appl. No. 10/712,375, filed Nov. 14, 2003, Blum et al.
Patent Abstracts of Japan, vol. 1998, No. 5, Apr. 30, 1998 (abstract of JP 10 001646 A, Nitto Denko Corp. Jan. 6, 1998).
Patent Abstracts of Japan, vol. 1998, No. 1, Jan. 30, 1998 (abstract of JP 09 253023, DAIKEN IKI KK, Sep. 30, 1997).
Advertising Materials For Alma (Advanced Laminated Material Applications, Inc.), CleanStep Contamination Control Mat. 12 pages, 1999.

* cited by examiner

FLOOR MAT INCLUDING TACKY SURFACE WITH TACKY-WHEN-DRY AND TACKY-WHEN-WET PROPERTIES

This application claims the benefit under 35 USC section 119(e) of U.S. provisional application 60/246,602, filed Nov. 8, 2000. Further, this application is a continuation-in-part of U.S. application Ser. No. 09/553,234, filed Apr. 19, 2000 and issued May 22, 2001 as U.S. Pat. No. 6,233,776. Application No. 09/553,234 is a continuation-in-part of U.S. application Ser. No. 09/418,752, filed Oct. 15, 1999 and now abandoned, which is a continuation-in-part of U.S. application Ser. No. 09/304,051, filed May 4,1999 and issued Apr. 24, 2001 as U.S. Pat. No. 6,219,876.

BACKGROUND AND DISCUSSION OF THE INVENTION

The present invention relates to a floor mat. More specifically, the invention provides a floor mat that includes a cleanable portion. The floor mat may also include a water dissipation component, a water absorbing component, a cushioning component, customized graphics, a transparent cleanable portion, a tacky surface on the cleanable portion, an antibacterial composition, an antifungal composition, and a fragrance. The cleanable portion may be erodible and may include a plurality of cleanable reusable layers. If a tacky surface is included in the floor mat, an anti-slip feature may be associated with the tacky surface to help prevent slipping on a possibly wet tacky surface. Additionally, a sensor system may be included in the floor mat to assist a user in identifying when the floor mat may require cleaning.

Floor mats are known for cleaning the soles of a person's shoes who is about to enter a particular area or room. One problem with floor mats in general is how to keep the floor mat sufficiently clean such that it may perform its function of cleaning the person's shoes when, by its very nature, it is purposefully dirtied when performing its function.

Known floor mats may be comprised of a single, unitary piece of material. Whereas these single structure floor mats may be kept clean by, for example, washing the floor mat, it may be required that the entire floor mat be removed from its location for washing and thus, the floor mat is not available where desired while the entire mat is being cleaned. Alternatively, even if the mat can be cleaned in-place, which may not be a possibility if it is located in, for example, a carpeted area, it may be inconvenient to clean the mat in-place.

U.S. Pat. No. 3,785,102 to Amos discloses a throw-away pad comprising a plurality of stacked disposable sheets where, when a particular sheet is dirtied, the dirty sheet is removed and disposed of. The next sheet that is exposed after the dirty sheet is discarded is clean and thus, a clean surface is again available. However, there may be problems with comprising the floor mat of disposable sheets. Disposing of each dirty sheet may be uneconomical since each sheet is discarded after it becomes dirty. Additionally, after some finite number of sheets are disposed of, no sheets will remain and thus no effective cleaning surface is available.

U.S. Pat. No. 3,785,102 to Amos also discloses that an adhesive can be provided on each sheet's top surface to improve its ability to remove dirt from a person's shoes. However, again, these sheets are not cleanable and therefore are not reusable.

U.S. Pat. No. 3,717,897 to Amos et al. discloses a pad for cleaning shoes and wheels. The pad includes a thin water-washable adhesive covering its upper surface for removing dirt from shoes and wheels. Whereas the '897 patent discloses a pad with a water-washable adhesive upper surface, the pad is not known for use in domestic or office-type applications. As stated in the '897 patent, the pad is placed at an entrance doorway leading into a clean room.

Tacky floor mats are by far more popular for utilization in indoor environments that are far removed from exterior outside entrances, such as for clean rooms that are well-within the interior of the building in which they are used, e.g., hospital rooms, computer chip manufacturing spaces, and gymnasiums. Thus, tacky floor mats are not known for use in areas that are adjacent to entrances that lead from the outdoor environment for cleaning the soles of a person's shoes prior to entry into the interior of a building, such as for example in an entry foyer or on an outdoor porch.

Tacky floor mats are not known for use in domestic or office-type applications, e.g., home or business office use, because of several known deficiencies. One of these deficiencies is that their tacky surface will not be as effective if it becomes wet. Therefore, if the tacky surface floor mat was utilized in an outdoor environment, such as the outdoor porch mentioned above, or in an indoor environment that is adjacent to or near an outdoor entrance, such as an entry foyer of a home or business, for cleaning a person's shoes prior to further entering the home or business, the mat is likely to become wet and therefore not effective. The mat could become wet from, for example, the moisture in the atmosphere or from moisture carried on the soles of the person's shoes who steps on the mat. Additionally, if the tacky surface becomes wet it may become slippery and thus cause a hazard for the person who steps on it.

More particularly, over the past several decades, the adhesives that are typically used in tacky surfaces of floor mats have evolved to the point that they have been optimized through commercialization to a certain threshold of tackiness. Nevertheless, even at this optimal threshold, the tacky surface has the deficiency described above, wherein the tacky surface may become slippery when wet.

Efforts to address this problem by tinkering with the chemistry of the adhesives used in the tacky surface have been unavailing. Beyond the optimal threshold of tackiness as described above (that is, if the tacky surface is made tackier), a trip hazard is presented when the surface is dry. On the other hand, below the threshold (that is, if the tacky surface is made less tacky), a slip hazard is presented when the tacky surface is wet.

In consideration of the foregoing, a single chemistry for an adhesive that provides a tacky surface that is tacky both when wet and when dry is not known. Accordingly, there is a need for a floor mat with a tacky surface that can be utilized in both a wet environment and a dry environment.

Additional deficiencies with using known tacky floor mats for home or office-type applications as discussed above is their likelihood of becoming trip hazards and their lack of aesthetic appeal. In the '897 patent, because the pad is designed for use in clean room environments, it is adhesively adhered to the passageway floor in front of the entrance doorway. This may be satisfactory for retaining the mat in-place in clean room-type of applications, however, if it was attempted to use the '897 pad on a carpeted floor, the pad would not properly adhere to the carpet and thus a trip hazard would be present. This could result in significant liability issues. The '897 pad does not have sufficient mass for it to remain in-place without utilizing an adhesive. Regarding aesthetics, because tacky floor mats are known only for their functional characteristics, and thus for use only in "clean room"-type applications, they are not aesthetically pleasing. Therefore, for at least the above reasons, tacky floor mats are not known for use in home or office-type applications.

Additional drawbacks with known floor mats exist that are directed to issues of customization for a particular purchaser and a lack of additional cleaning properties. A floor mat may be the first object that a visitor to a particular home or business encounters. As such, the owner of the home or business may want to utilize the floor mat to graphically convey an initial greeting or message to the visitor. Whereas floor mats are known that may include a greeting on them, it is not currently known to allow for a particular purchaser to customize the displayed graphic so that the message is tailored to convey a particular message desired by the purchaser. For example, on Halloween the purchaser may want the floor mat to display a "Happy Halloween" message. In another situation, the purchaser may want to greet a particular visitor with a message such as "Hello, Joe". Currently, it is not known to provide a floor mat where an individual can customize the floor mat to display a particular message that they want to convey and in certain circumstances even change the floor mat's message they want to convey.

An additional problem with known floor mats, as mentioned above, is that they are limited in their ability to clean the soles of a person's shoes. Whereas known floor mats may be capable of removing dirt particles from the shoe's soles, they are not able to disinfect the soles nor provide a scent to the soles to assist in masking any unpleasant odors that may be associated with the shoes.

An additional drawback with known floor mats, even if they are cleanable, is that they do not assist a user in determining when the floor mat may require cleaning. Generally, the owner or custodian of the floor mat does not continuously or regularly monitor the condition of the floor mat with respect to cleanliness. Therefore, the floor mat could require cleaning, and because the owner is not consciously monitoring the condition of the floor mat, there could be a significant period of time before the owner realizes that the floor mat requires cleaning. Therefore, it would be desirable to assist the owner/custodian of the floor mat in determining when the floor mat requires cleaning.

Therefore, it would be desirable to provide an advanced floor mat that could address deficiencies that exist with currently known floor mats. The advanced floor mat of the present invention overcomes deficiencies in the prior art and may include a base portion which incorporates a cleanable portion that is adapted to be removably received within the floor mat. The floor mat may also include features such as a water dissipation capability, a water absorbing capability, a cushioning capability, customized graphics, a transparent portion, a tacky surface on the cleanable portion, an antibacterial composition, an antifungal composition, and a fragrance. The cleanable portion may include the features of being erodible and containing a plurality of cleanable reusable layers. If a tacky surface is included in the floor mat, an anti-slip feature may be associated with the tacky surface to help prevent slipping on a possibly wet tacky surface. Additionally, a sensor system may be included in the floor mat to assist a user in identifying when the floor mat may require cleaning. Other features will be apparent from the detailed description which follows.

BRIEF DESCRIPTION OF THE DRAWINGS

The various features of the invention will best be appreciated by simultaneous reference to the description which follows and the accompanying drawings, in which.

DETAILED DESCRIPTION

Figure 1:
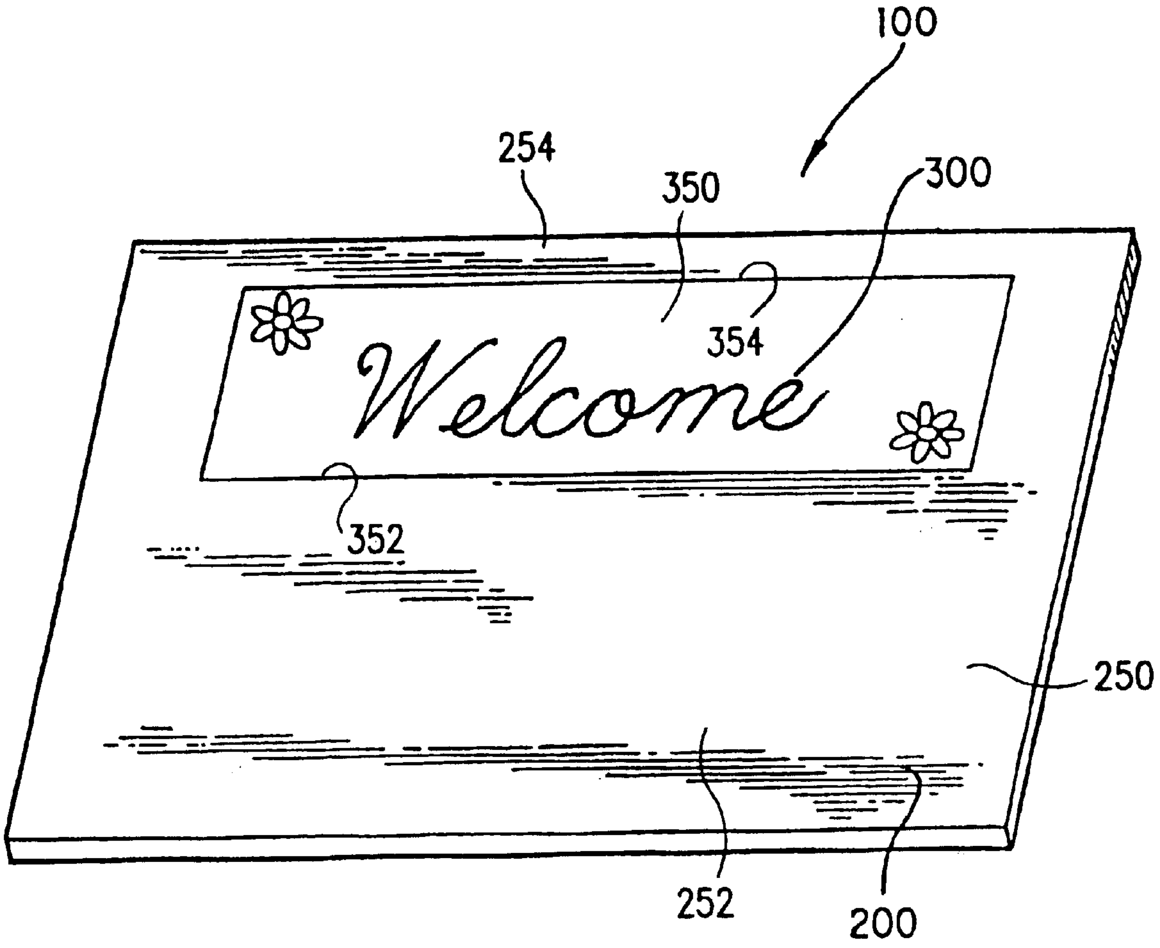
FIG. 1 is a perspective view of a floor mat in accordance with an embodiment of the present invention.

FIG. 1 illustrates a first embodiment for a floor mat 100 in accordance with the principles of the present invention. As can be seen in FIG. 1, floor mat 100 includes a base portion 200 and a cleanable insert portion 300. As will be further described later in this specification, in this embodiment, cleanable portion 300 is received within base portion 200 and is removable from base portion 200.

Figure 2:
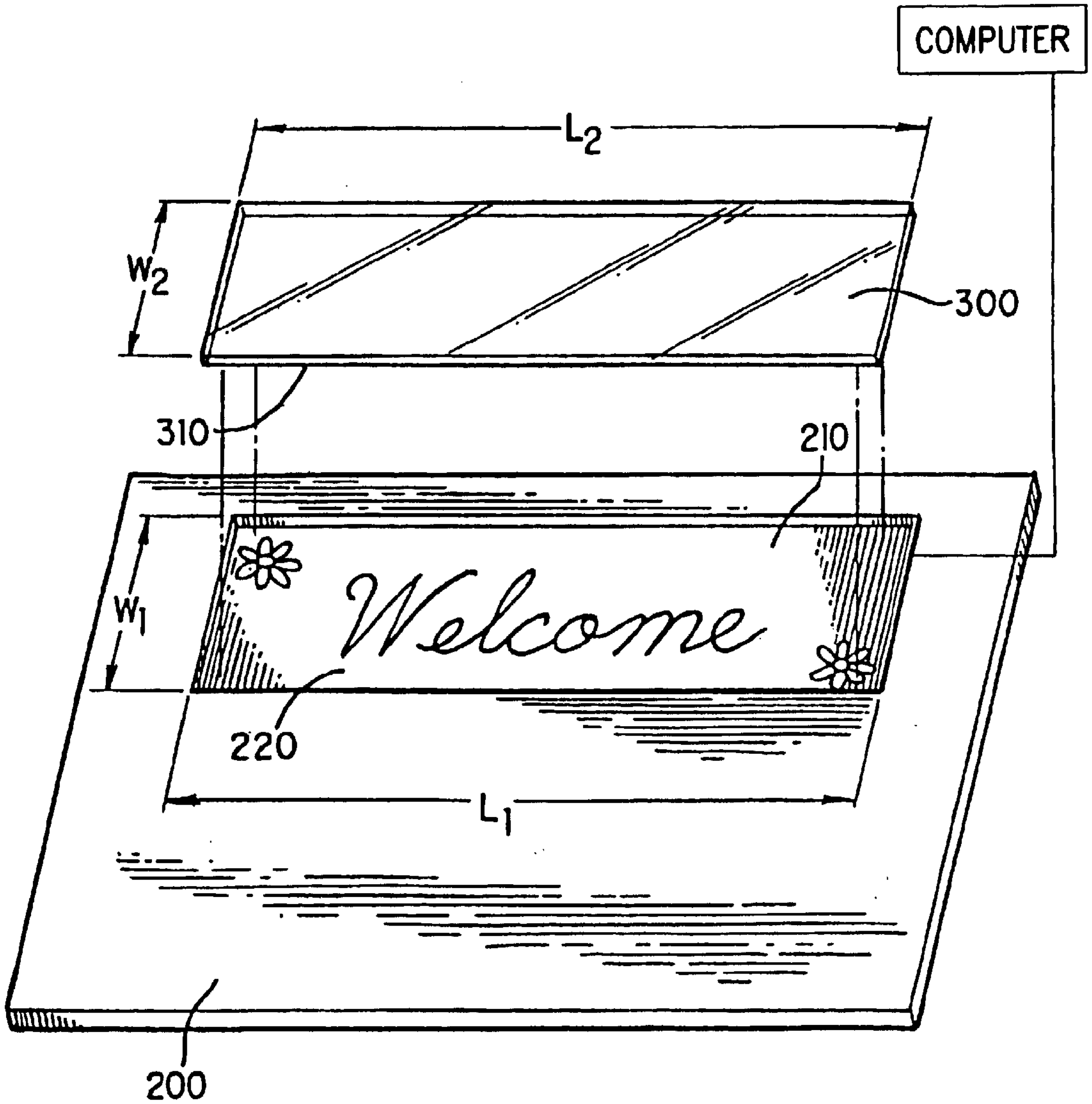
FIG. 2 is an exploded perspective view of the floor mat of FIG. 1.

FIG. 2 illustrates an exploded, perspective view of the floor mat of FIG. 1. As can be seen in FIG. 2, base portion 200 is formed as a generally flat, planar member and defines a recess 210 within the top surface of base portion 200. Base portion 200 provides sufficient weight and mass for supporting cleanable insert portion 300 and maintaining the floor mat's positioning on the surface on which it is placed. Base portion 200 may include, as will be discussed below, a water dissipation capability, a water absorption capability, and a cushioning capability and may be comprised of materials such as polyurethane, polyisoprene and other cross-linked elastomeric materials, such as nylon-6, molded or woven to form a porous structure. Recess 210 can be configured in any of a variety of geometric configurations, however, in the present embodiment, recess 210 is configured in a rectangular shape. Recess 210 has a length $L_1$ and a width $W_1$. The depth of recess 210 is such that it is able to receive within it cleanable insert portion 300 such that when cleanable insert portion 300 is received within recess 210, the top surface of cleanable insert portion 300 lies generally in the same plane as the top surface of base portion 200.

The top surface of base portion 200 may be colored with any color depending upon the desires of a particular purchaser, however, it is preferable that a color be utilized that will minimize the visibility of any dirt that is accumulated by base portion 200. For example, it may be desirable that darker colors be utilized for the top surface of base portion 200 rather than lighter colors. However, again, any particular color may be utilized for base portion 200, and particularly the top surface of base portion 200, depending upon the particular desires of an individual. Additionally, the base portion 200 may be either translucent or opaque.

As can be seen in FIG. 2, the surface of base portion 200 which defines the bottom of recess 210 may include graphics 220 on that surface. In the illustrated embodiment, the graphics include pictorial representations of flowers and a text message which spells out the word "WELCOME". The present invention is not limited to any particular graphic within recess 210 and the present invention may include any of a variety of different forms of graphics.

Graphics 220 may be modified, and thus customized, by an individual after the floor mat has been purchased by the owner. The owner may customize the mat at their home or office and, thus, a graphic that may be appropriate for a particular situation may be modified by the individual for display in another situation. For example, the graphic may display a message stating "Happy Halloween" for Halloween and may be modified to display "Happy Holidays" during the winter holiday season. Thus, as can be understood, the graphics are modifiable by a user and thus, may be customized for the particular desires of a particular user.

As stated above, the present invention is not limited to any particular form for graphics 220. The graphics 220 can be customized by a user to include any of a variety of different colors, pictures, messages, or other representations that the user may want to display. In addition, the visible intensity of a color(s) can be modified. For example, a color that glows at night could be included in graphics 220 for an occasion such as Halloween.

Any of a variety of different types of structures or methods may be practiced in the present invention for modifying graphics 220 of floor mat 100 and the present invention is not limited to any particular methodology or structure for modifying graphics 220. Additionally, all of the various embodiments contemplated for providing a modifiable graphic display in the floor mat of the present invention can be incorporated in either, or both, of the base portion or the insert portion. For example, the graphics may consist of pre-formed messages or art forms which may be adhered to either the surface which defines the bottom of recess 210, such as by using an adhesive or fastener assembly, e.g., a hook and loop assembly, or to the underside of insert portion 300 such that, when insert portion 300 is placed within base portion 200, the graphics would be visible through a transparent insert portion.

Alternatively, a variety of different graphics may be stored within floor mat 100 such that a user is able to selectively uncover a particular graphic for display while the other available graphics remain covered within floor mat 100. This type of selectability is known in other mediums where selectivity between a variety of different graphics within a common display panel is desired. For example, advertising bulletin boards at sporting events are able to selectively display a first particular message during a first particular period of time and display a second message during a second period of time on the same bulletin board.

A third possible alternative is to provide a modifiable display on the floor mat. The display surface can be associated with either the base portion or the insert portion, e.g., on either the bottom surface of recess 210 or attached to the bottom of insert portion 300. A display could be included on the front of the floor mat, on the back of the mat such that it is viewable through a transparent portion of the mat, embedded in the mat, attached to the mat, or integrally formed in the mat. For example, the display could be comprised of a small, thin box of graphics that could attach to a tacky portion and/or a base portion or any other component part of the floor mat. However it is associated with the floor mat, a user may design and display their customized graphic and may subsequently modify that graphic such that it is replaced with another graphic. A display surface such as an erasable writing board could be utilized for this purpose.

It is also contemplated that a modifiable electronic display surface could be provided, such as, for example, a liquid crystal display. The display could be connected to a computer and a computer generated image could be displayed on the display. Thus, the image displayed on the display could be modified by generating a different computer image and displaying that computer image on the display. The display could be associated with base portion 200, such as included within recess 210, or could be included on a bottom surface, facing upward, of insert portion 300. Alternatively, the display could be integrally formed with either of the base portion or the insert portion. The modifiable display could utilize a plurality of different graphics that can be displayed in any of a variety of manners on the display. For example, the graphics could be displayed in a generally fixed position on the display or could scroll across the display, with both exemplary methodologies displaying multiple graphics either individually or in combination.

Other alternatives for modifying the graphics 220 of floor mat 100 include using light emitting polymers to create, and thus change, graphics 220. The light emitting polymers can be either applied to, attached to, or woven into the floor mat. The light emitting polymers may be utilized on any portion of floor mat 100, for example, on either the base portion or the insert portion, or on any other portion of the different embodiments for the floor mat. Light emitting polymers are known and described in U.S. Pat. Nos. 5,945,502, 5,869,350, and 5,571,626, which are incorporated herein by reference in their entirety.

Other options for a display are to use electronic ink or electric paper. Electric paper is available from Xerox and is described in U.S. Pat. Nos. 5,723,204, 5,604,027, 4,126,854, and 4,143,103, which are incorporated herein by reference in their entirety. Electric paper employs thousands of tiny, electrically charged beads, called Gyricon, each about the width of a human hair, to create pixels. The two-tone beads are embedded inside a liquid-filled plastic sheeting that forms the surface of the paper. Each bead, half-black, half-white, gyrates in response to an electric field. Whether the beads are black- or white-side up determines the image. Because there's no need to refresh the image, and because the screen isn't backlit, electric paper uses only a fraction of the power used by conventional electronic displays. Electromagnetic styluses and printer-like devices can be used for getting images onto the paper.

Electronic ink is available from E Ink Corp., at 45 Spinelli Pl., Cambridge, Mass. 02138. Electronic ink uses a microencapsulated micromechanical display system. Tiny microcapsules are captured between two sheets of plastic to create pixels. Alternatively, the capsules may be sprayed on a surface. The result is a flexible display material. The tiny capsules are transparent and contain a mixture of dark ink and white paint chips. An electric charge is passed through the capsules. Depending on the electrostatic charge, the paint chips float at the top or rest on the bottom of each capsule. When the paint chips float at the top, the surface appears white. When they rest at the bottom, and thus under the ink, the surface appears black. Each of the two states is stable: black or white. A transparent electromagnetic grid laid over the sheet's surface controls the shape of the image. The display may be wirelessly connected to, for example, a computer and thus, the World Wide Web by utilizing, for example, a Motorola paging system. Text on all displays, if multiple displays are used, can be changed at once by a single editor, through a Web page.

Again, a display, which could utilize any of the methods discussed above for modifying the display, could be associated with any portion of the floor mat, such as base portion 200 within recess 210 or on a bottom surface, facing upward, of insert portion 300. Alternatively, the display could be integrally formed with either of the base portion or the insert portion. The display could be utilized in any of the embodiments disclosed herein for the floor mat of the present invention, including a floor mat that includes a tacky surface and a non-tacky floor mat embodiment.

In further describing base portion 200, as mentioned above, base portion 200 may also include both a water dissipation component and a cushioning component. The water dissipation component provides for transferring moisture from the soles of a person's shoes that is standing on floor mat 100 to reduce the degree of moisture transferred to cleanable insert portion 300 and the cushioning component provides for conforming the floor mat 100 to the shape of the person's soles such that a greater amount of the debris on the person's soles may be removed by floor mat 100. The present invention is not limited to any particular structure or material for the water dissipation component and the cushioning component. For example, the water dissipation component may be comprised of any of a wide variety of known materials, such as polyamides, vinylics, and polyisoprene. It is desirable, but not required, that the water dissipation component dissipate or move the water and not retain the water. Thus, porous materials, and not hydrophilic materials, are desired. The cushioning component may be comprised of any of a variety of cushioning components to include, for example, foam rubber.

FIG. 2 also further illustrates cleanable insert portion 300. As can be seen, cleanable insert portion 300 has a geometric shape which is complementary in size and form to the recess 210 that is formed within base portion 200. As such, cleanable insert portion 300 is able to be received securely within recess 210. Thus, cleanable insert portion 300 has a length $L_2$ which is just slightly smaller than the length $L_1$ of recess 210. Likewise, cleanable insert portion 300 has a width $W_2$ which is also just slightly smaller than width $W_1$ of recess 210.

On the bottom side 310 of cleanable insert portion 300, i.e., that surface which contacts the surface which defines the bottom of recess 210, an attachment mechanism may be provided such that cleanable insert portion 300 may be removably attached to base portion 200 within recess 210. Any of a variety of different attachment mechanisms may be provided on the bottom surface of cleanable insert portion 300 to include, for example, a hook and loop fastener assembly or an adhesive. Regardless of the particular securement mechanism used to removably attach cleanable insert portion 300 to base portion 200, in this embodiment, cleanable insert portion 300 may be removed from base portion 200 such that it may be cleaned by a user and, after cleaning, be reinserted within recess 210 such that a clean surface is now provided for floor mat 100.

As stated above, cleanable insert portion 300 may be formed from a transparent material such as hydrophilic aliphatic acrylic polymers and copolymers incorporating acrylic acid, hydroxy ethyl methacrylate, and glycerin monomethacrylate. Forming cleanable insert portion 300 of a transparent material would allow an individual to view the customized graphics that may be provided within floor mat 100, as discussed previously. Alternatively, the insert portion 300 could be opaque.

Additionally, the top side of cleanable insert portion 300 may include a tacky surface. The tacky surface would provide for assisting in removing debris from the soles of a person's shoes that is standing on cleanable insert portion 300. When the top tacky surface of cleanable insert portion 300 is dirtied to such an extent that the user desires to clean insert portion 300, in this embodiment, the user removes insert portion 300 from base portion 200 and cleans insert portion 300 to remove the accumulated debris. The insert portion 300 is then reinserted into base portion 200.

The tacky surface that is provided on the top side of cleanable insert portion 300 could be comprised of any of a variety of materials, such as polyvinyl chlorides combined with a suitable plasticizer, plasticized neoprene, polysulfides, and polyurethanes. Additionally, acrylics, such as butyl acrylate and many of its homologues, may be utilized. Again, the present invention is not limited to any particular material. The tacky surface may be formed, generally, from any adhesive material. The only consideration, in this embodiment, is that the surface should maintain its tacky characteristic even after repeated cleaning cycles.

The present invention is not limited to any particular methodology for cleaning insert portion 300. Insert portion 300 may be cleaned by any of a variety of methods depending upon a particular material composition for insert portion 300. For example, insert portion 300 may be cleaned by placing insert portion within a washing machine and washing insert portion 300 or insert portion 300 may be cleaned by scrubbing insert portion 300 with a scrub brush and soap and water or with a cleaning agent such as "Spic 'N Span".

Additionally, the insert portion 300 could be cleaned by utilizing a roller that also includes a tacky surface around the circumference of the roller. The tacky surface of the roller is comprised of a stronger adhesive than that of the tacky insert portion such that, as the tacky surface of the roller is rolled over the tacky surface of the insert portion, any dirt and debris on the tacky insert portion will be drawn off of the tacky insert portion and will adhere to the roller. In this manner, a roller with a tacky surface could be utilized to clean the tacky insert portion.

Again, however, the present invention is not limited to any particular methodology or cleaning agent for cleaning insert portion 300 and any cleaning methodology or agent compatible with the composition of insert portion 300 is contemplated.

Floor mat 100 may also include additional features for assisting in the cleaning of the soles of a person standing on floor mat 100. For example, base portion 200 and/or insert portion 300 may include an antibacterial composition and an antifungal composition. Antibacterial compositions such as anthraquinone derivatives of polyethylene glycol mono- and di-methacrylate could be utilized. Thus, floor mat 100 would be bacteriacidal. The antibacterial feature would be particularly desirable because the floor mat would be able to both clean structural debris from the soles of the person's shoes and remove any potentially harmful bacteria from the person's soles as well.

Additionally, in order to further provide for a desirable sole surface prior to entering a particular area, floor mat 100 could also be provided with a fragrance. Flavones such as tricyclic molecules with aromatic substitution or organic ethers, e.g., limonoic acid, could be utilized. The fragrance is transferred from floor mat 100 to the soles of the person's shoes such that any undesirable odors are favorably masked by the fragrance.

The present invention is not only limited to utilizing an antibacterial composition, an antifungal composition, and/or a fragrance in floor mat 100. Rather, floor mat 100 could also incorporate a variety of other substances that would assist in cleaning the soles of a person's shoes.

Any variety of structures or methods could be utilized for associating an antibacterial composition, an antifungal composition, a fragrance, or any other composition, with floor mat 100. The substances could be applied as releasable, or dissipatable, coatings to floor mat 100 or could be releasably embedded as, for example, pellets within the structure of floor mat 100 such that as pressure is applied to floor mat 100 the substances are dispensed to the soles of the person's shoes.

Figure 3:
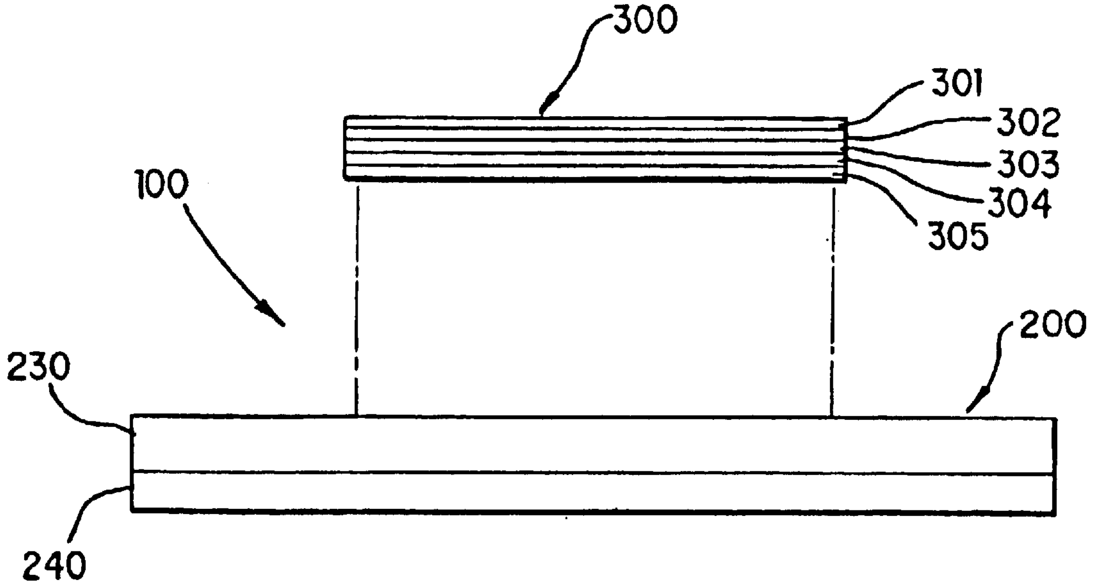
FIG. 3 is an exploded side view of an alternative embodiment of the floor mat of the present invention.

FIG. 3 illustrates an alternative embodiment for floor mat 100. In FIG. 3, it is illustrated that base portion 200 may include separate layers for a water dissipation component 230 and a cushioning component 240. Water dissipation component 230, in this embodiment, is disposed on a top side of the cushioning component 240. However, the present invention is not limited to this particular embodiment for water dissipation component 230 and cushioning component 240. For example, a single hybrid structure could be utilized for base portion 200 that would include the material properties to provide for both water dissipation and conforming structure.

Figure 4:
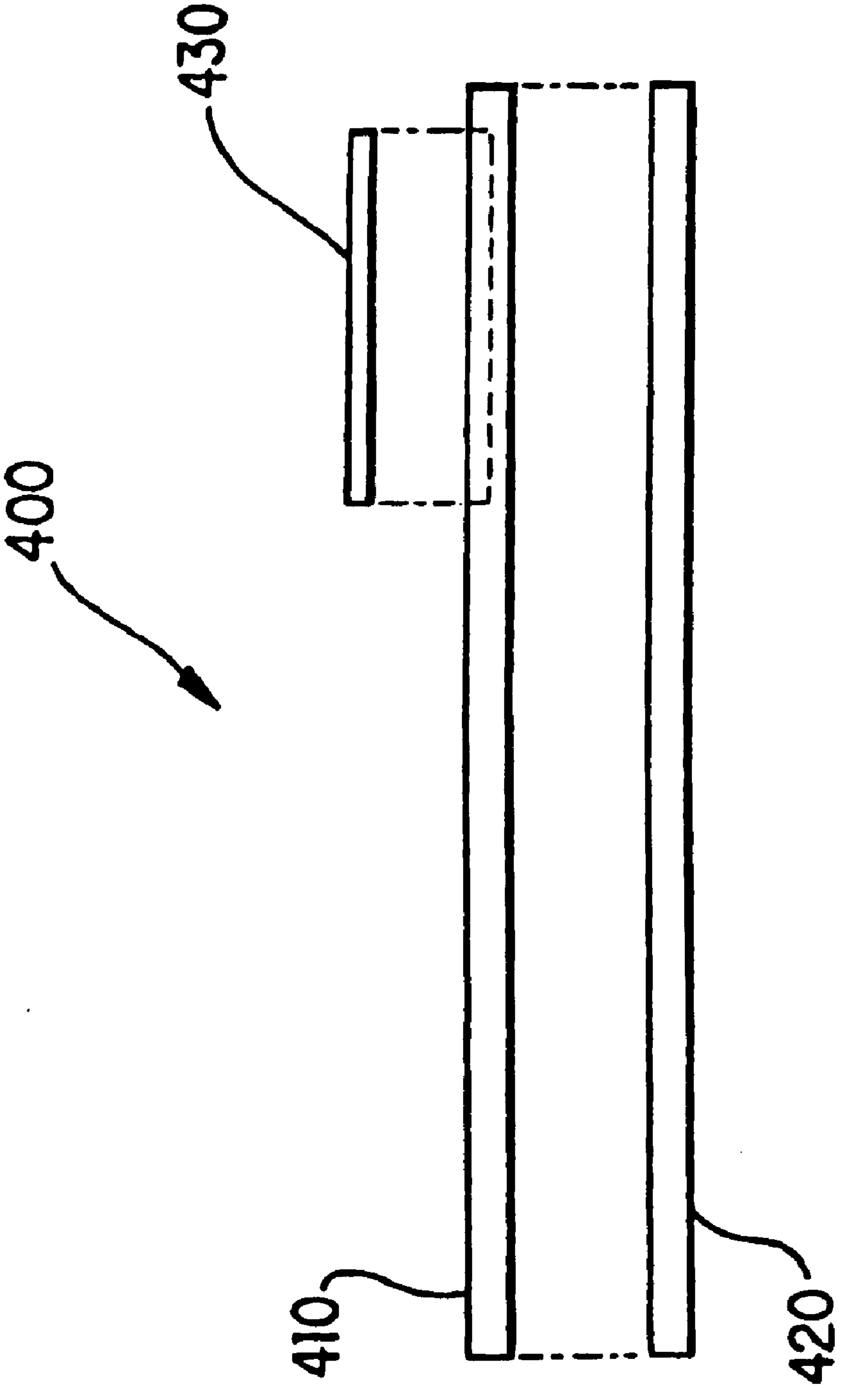
FIG. 4 is an exploded side view of an alternative embodiment of the floor mat of the present invention.

Alternatively, FIG. 4 illustrates that the floor mat may include both a water dissipation component, or wicking layer, and a water absorbtion layer. In FIG. 4, floor mat 400 includes wicking layer 410 and water absorption layer 420. The wicking layer 410 could be comprised of polypropylene or olefins, or any other suitable material that has the properties of moving the water from the surface of floor mat 400. The water absorption layer 420 is disposed underneath the wicking layer 410 and absorbs any water that passes through the wicking layer 410. The water absorption layer 420 could be periodically removed and dried, such as by example only, in a drying machine. Of course, a wicking layer 410 may be used either with or without a water absorption layer 420 and a cushioning layer, as described previously in other embodiments, and the water absorption layer 420 could be used with or without a wicking layer 410 and a cushioning layer. Additionally, both the wicking layer and/or the absorption layer and/or the cushioning layer could be used with or without a tacky portion.

Returning to FIG. 3, FIG. 3 also illustrates an alternative embodiment for insert portion 300. Whereas the previously disclosed embodiment for insert portion 300 was discussed as a single structural member that could include a tacky surface on a top side thereof, the embodiment of FIG. 3 for insert portion 300 is comprised of a plurality of layers. As can be seen, layers 301–305, comprise insert portion 300. Each of the layers may include a tacky surface on a top side thereof, as was described previously for insert portion 300. In use, a top-most layer, e.g., layer 301, may be removed from its adjacent lower layer, e.g., layer 302, and may be independently cleaned. After cleaning, the layer may be reinstalled within recess 210 on top of the exposed layer of insert portion 300. In this manner, insert portion 300 may be cleaned by removing a top-most layer, cleaning that layer, and reinstalling that layer within recess 210. Whereas each layer is described as being independently cleanable, it is not required that each individual layer be cleanable. Each layer may be formed of materials as described previously when discussing the embodiment of FIGS. 1 and 2 for the insert portion.

Other alternative embodiments for insert portion 300 are contemplated. For example, whereas the previously disclosed embodiments discussed insert portion 300 as being comprised of one or more layers with a tacky surface on a top side of the layer(s), it is not required that insert portion 300 be formed with only a tacky surface on a top side thereof. More specifically, an alternative embodiment for insert portion 300 could include forming insert portion 300 as a single structural member from a material which is tacky in composition throughout the entire cross-section of the material. A material such as a blend of a noncross-linked hydrophilic thermoplastic, preferably a polyethylene glycol diacrylate with n not exceeding 15, and a hydrophobic material, such as a polyvinyl neoprene chloride, could be utilized for the insert portion of this embodiment. By forming insert portion 300 from a uniform, tacky material, the insert portion 300 does not necessarily have to be removed from recess 210 of base portion 200 to be cleaned. Insert portion 300 could be cleaned in this alternative embodiment by eroding the top surface of the insert portion as a result of use of the insert portion. Thus, by providing an erodible insert portion, the insert portion may be cleaned by the erosion of its top surface as the insert portion is used within floor mat 100.

As insert portion 300 erodes, the exposed surface of insert portion 300 continues to be tacky in composition because of its uniform cross-section. As the exposed tacky surface erodes, the dirt captured by the exposed tacky surface will dissipate as a result of the erosion and thus, the erosion of the insert portion itself provides for a cleanable insert portion.

Alternatively, even with a uniform cross-section of a tacky substance for insert portion 300, the user may remove insert portion 300 from recess 210 and separately clean insert portion 300. Thus, the user is not required to rely solely on the erodible characteristic of insert portion 300 for cleaning of insert portion 300; rather, the user may utilize the erodible cleaning feature of the insert portion in combination with a separate cleaning step of removing the insert portion from the base portion and independently cleaning the insert portion.

As discussed above, insert portion 300 may be comprised of a variety of materials, including materials such as tacky plastics, paper, or adhesives that can be cleanable and may or may not be erodible and reusable. If paper is utilized, the insert portion may be formed as a single structural member or as a plurality of layers, as discussed previously. Additionally, the paper may include a tacky surface on a top-side thereof. The paper may be translucent, opaque, or colored, and may include a graphic display thereon.

Figure 5:
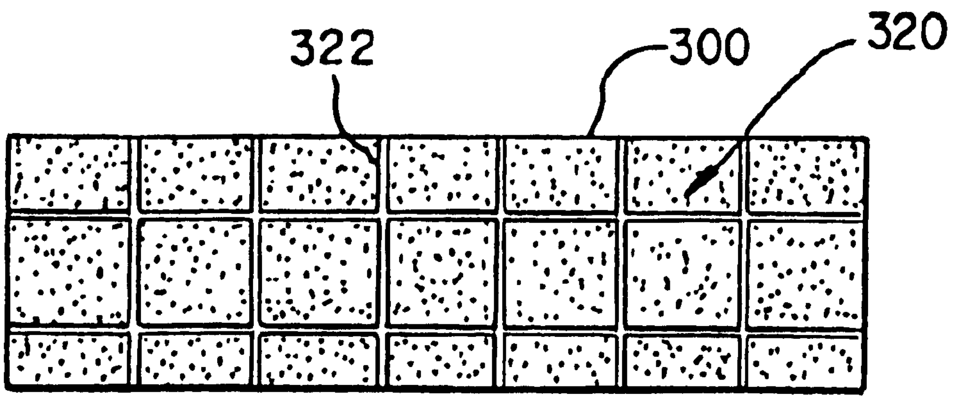
FIG. 5 illustrates a third alternative embodiment for a tacky insert portion with an anti-slip feature for the floor mat of the present invention.

As discussed earlier, it is desirable, but not required, that the floor mat contain a water dissipation and/or absorption capability. This capability is desired to help prevent the tacky surface of the insert portion from becoming excessively wet and, thus, slippery. Whereas it has been discussed that, in order to help prevent a user from slipping on the tacky surface of the insert portion, a water dissipation and/or absorbing capability could be included in the floor mat to reduce the degree of moisture on the tacky surface, this is not the only structure contemplated for preventing the tacky insert portion from becoming slippery. Alternatively, the tacky insert portion itself could be formed to help prevent slipping. FIGS. 5–12 and 23–27 illustrate alternative embodiments for tacky insert portion 300. FIG. 5 illustrates tacky insert portion 300 as including a grid pattern 320 of channels 322 that could be comprised of a non-tacky material. The channels could be either raised from the surface of insert portion 300 or could lie co-planar with the top surface of the insert portion. By forming the channels of a non-tacky material, even if the tacky material of insert portion 300 became wet, a user would be assisted in not slipping on the slippery, wet tacky surface of the insert portion by the presence of the non-tacky surfaces which do not become slippery when wet.

Figure 6:
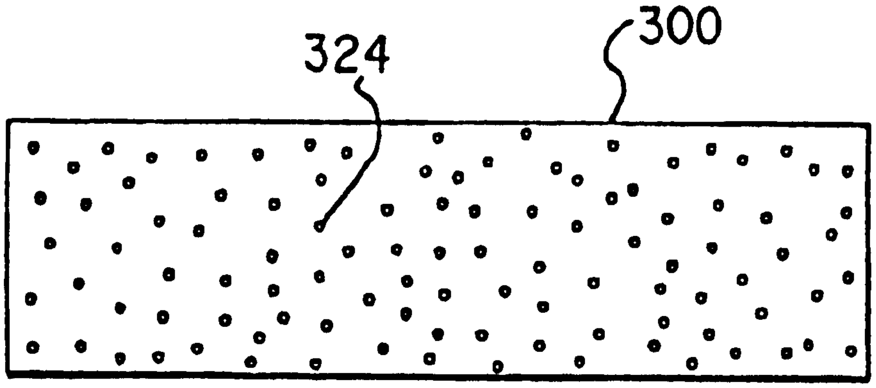
FIG. 6 illustrates a fourth alternative embodiment for a tacky insert portion with an anti-slip feature for the floor mat of the present invention.
Figure 7:
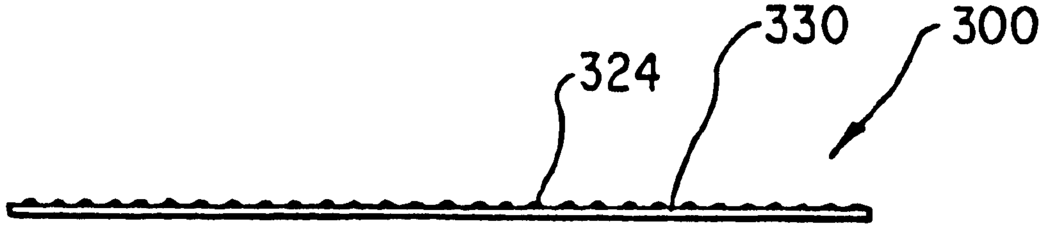
FIG. 7 is a side view of the embodiment for the tacky insert portion with an anti-slip feature of FIG. 6.

FIGS. 6 and 7 illustrate another alternative embodiment for tacky insert portion 300 which includes anti-slip particles 324, e.g., silicon or sand particles, which extend above the top surface 330 of the tacky insert portion. It is desirable that the anti-slip particles be comprised of a material that does not become slippery when wet and that they be exposed from the tacky surface, however, it is not required. Even if the anti-slip particles are embedded within the tacky surface, their extension above the top surface 330 of the tacky insert portion will provide a physical frictional restraint against slipping for the soles of a person's shoes who is standing on the floor mat.

Whereas FIG. 5 illustrates tacky insert portion 300 as including a grid pattern 320 of channels 322 that could be comprised of a non-tacky material and FIGS. 6 and 7 illustrate another alternative embodiment for tacky insert portion 300 which includes anti-slip particles 324 which extend above the top surface 330 of the tacky insert portion, it is not required that these two alternative embodiments contain features that are mutually exclusive. For example, it is contemplated that tacky insert portion 300 could include both a grid pattern of non-tacky channels and anti-slip particles, which is not illustrated specifically in the Figures but which can be easily understood.

Figure 8:
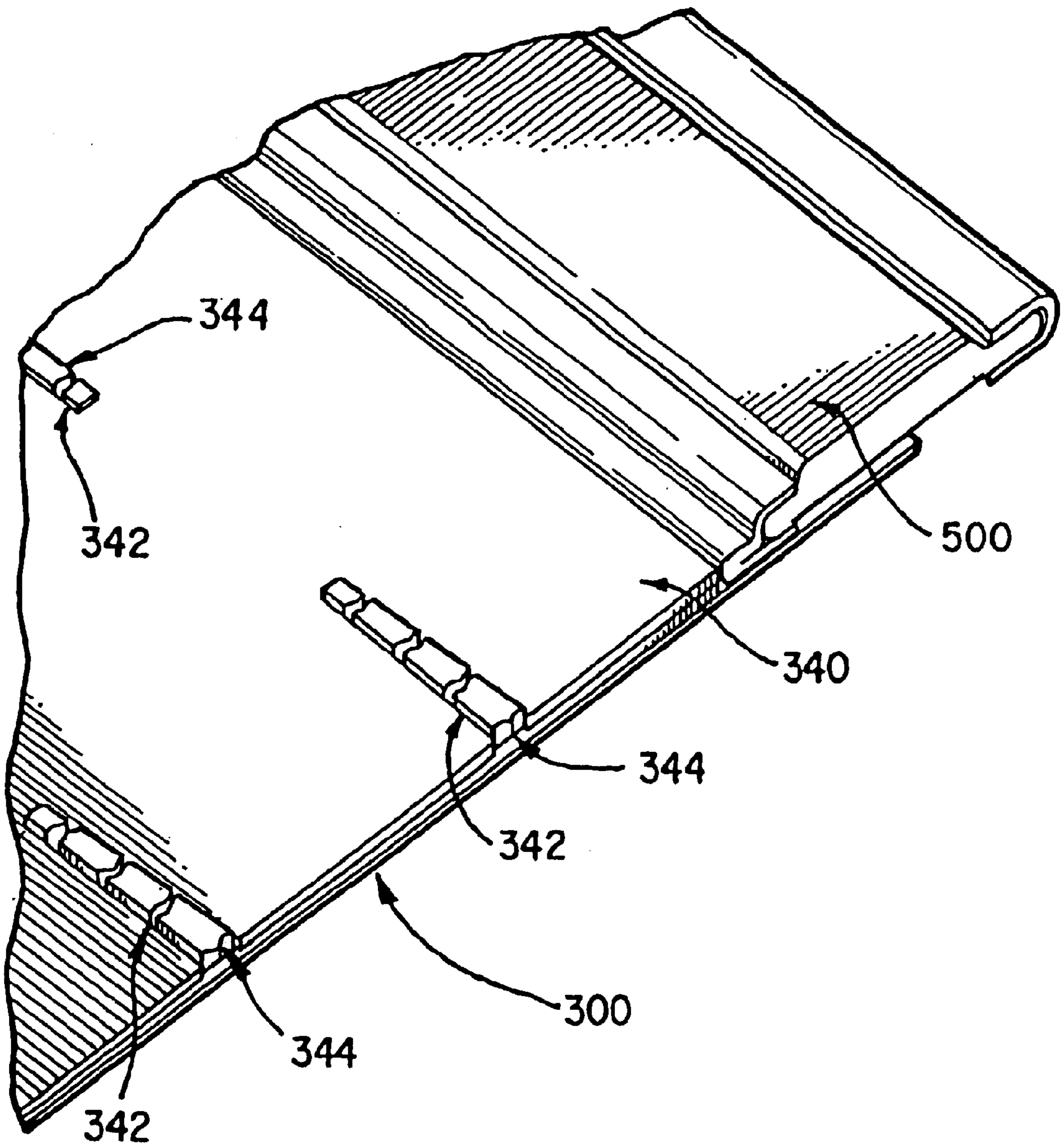
FIG. 8 is a perspective view of a fifth embodiment for a tacky insert portion with an anti-slip feature for the floor mat of the present invention.

Another alternative for providing a slip-resistant tacky portion is to include a plurality of anti-slip members, or treads or nipples, that extend up through and slightly above the surface of the tacky portion. As can be seen in FIG. 8, in this embodiment, tacky portion 300 is inserted within a base portion, which may be a water absorbent border 500, and includes a plurality of apertures 342 within it. Each of a plurality of treads 344, which may extend upward from a base disposed underneath tacky portion 300, extend up through one of the plurality of apertures 342. A top-most end of each tread extends above a top-most surface 340 of tacky portion 300. As a person steps onto tacky portion 300, the quantity and positioning of the treads 344 is such that the tacky portion is able to remove debris from the person's shoes and the treads 344, at least one of which is stepped upon by the person, prevents slipping of the person on the tacky portion 300 should the tacky portion 300 become slippery when wet. The treads 344 may compress when stepped upon such that the top-most end of the tread is co-planar with the top-most surface 340 of the tacky portion 300. In this manner, the tread will contact the person's shoes to prevent slipping but yet not hinder contact between the person's shoes and the tacky surface of the mat, which enhances the cleaning of the person's shoes. Therefore, there is a relationship between the distance that the tread extends above the top-most surface of the tacky portion and the compressibility of the tread; a relationship which provides the functionality discussed above.

The treads may be configured in any shape and size. Additionally, the treads may be comprised of any material which is slip-resistant when wet, such as, for example, rubber or plastics. The treads may include grooves within them to further assist in preventing a person from slipping on the tacky portion.

Figure 9:
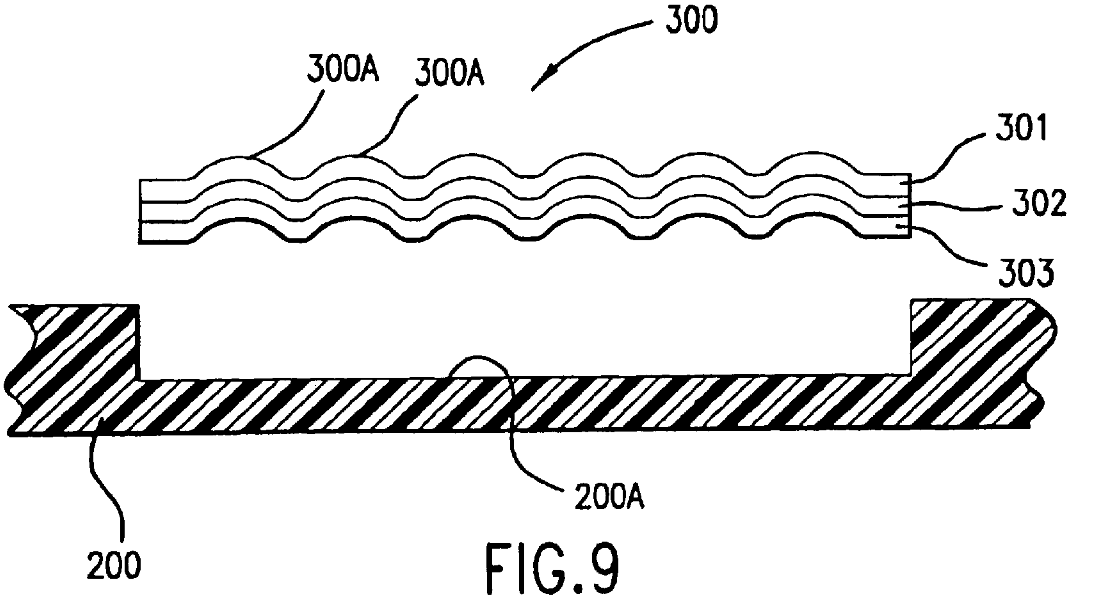
FIG. 9 illustrates a sixth alternative embodiment for a tacky insert portion with an anti-slip feature for the floor mat of the present invention.
Figure 10:
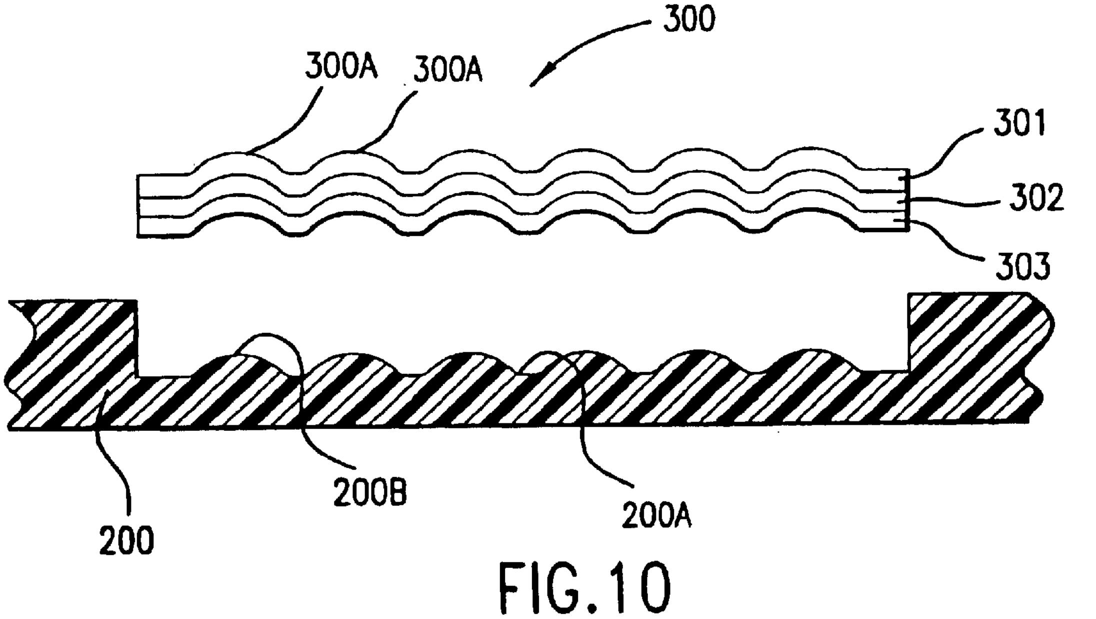
FIG. 10 illustrates the tacky insert portion with an anti-slip feature of FIG. 9 in conjunction with an alternative embodiment for the base portion.

FIGS. 9 and 10 illustrate additional alternative embodiments for both the tacky insert portion 300 and the base portion 200 that help to prevent slipping on a potentially wet tacky portion. As can be seen in FIG. 9, and as discussed previously, tacky insert portion 300 is comprised of a plurality of layers 301, 302, and 303. Whereas only three layers are illustrated, it can be understood that any number of layers can be utilized in the present invention. As can be seen, tacky layers 301–303 each contain a plurality of integrally formed raised portions 300A. These raised portions can help to prevent a person from slipping on the tacky portion by providing increased friction between the top surface of the tacky layer, due to the raised portions, and the person's shoes. Thus, these raised portions can substantially reduce the potential for slipping on the tacky portion if it becomes wet.

The raised portion 300A can be formed in each layer in a variety of ways and the present invention is not limited to any particular method. One method for forming the raised portions is to assemble the layers into a pad of layers and then insert the entire pad into a machine press. One face of the press is flat and the other face, i.e., that face that is facing the non-tacky, or underside, of the layers, contains an array of bosses or bumps. When the pad is pressed in the machine press, all of the tacky layers become embossed with the pattern on the press face, causing the raised portions, or embossed portions, in each tacky layer of the pad. Thus, each embossed portion is integrally formed in each layer and is comprised of an indentation on the underside, or non-tacky side, of each layer and a raised portion on the upperside, or tacky side, of each layer.

As can be understood, in the method as described above for forming the raised portions, the raised portions of each layer are aligned with the raised portions of each other layer. It is desirable, but not required, that the raised portions of each layer are aligned so that their shape may be easily maintained when the layers are stacked one upon another.

As can be seen in FIG. 10, base portion 200 may also be formed to be complementary to the embossed layers. The surface 200A that defines a bottom of the recess of base portion 200, which receives within it the tacky layers 300, can be formed with raised portions 200B. These raised portions are positioned so that they are aligned with the raised portions in the tacky layers. Thus, the raised portions 200B on surface 200A are positioned within the indentations in the lower-most tacky layer when the layers are inserted into the recess in the base portion. As can be understood, these raised portions help to retain and maintain the raised portions in the tacky layer(s), particularly when only the lower-most layer(s) remain in the floor mat. However, it is not required that the base portion be formed with raised portions in practicing the present invention. The layers may be formed with raised portions whether or not the base portion includes complementary raised portions.

In another alternative embodiment for a tacky portion, the tacky portion could also include a water dissipating capability. The tacky portion could be comprised of a hydrophobic porous structure which would assist in dissipating water from the surface of the tacky portion.

Figure 11:
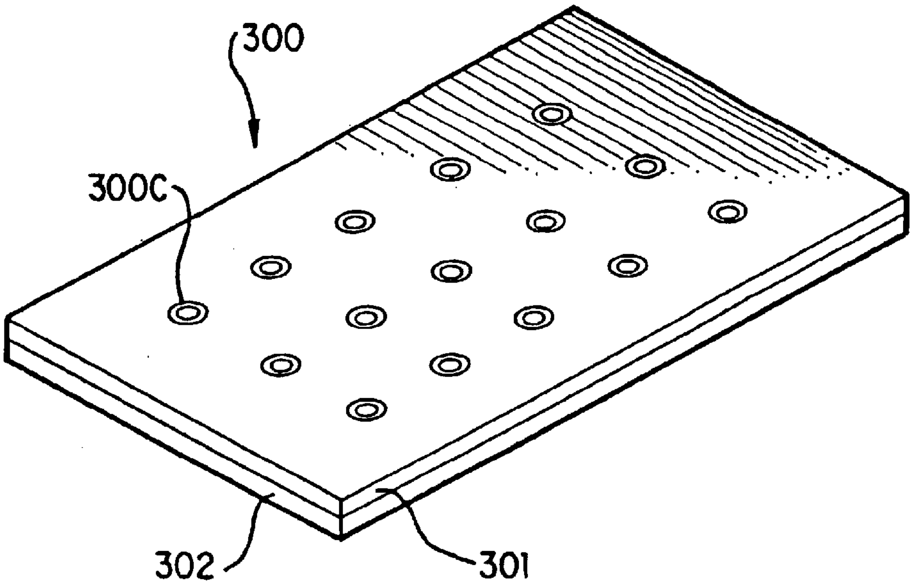
FIG. 11 illustrates a seventh alternative embodiment for a tacky insert portion with an anti-slip feature and a water dissipating capability for the floor mat of the present invention.
Figure 12:
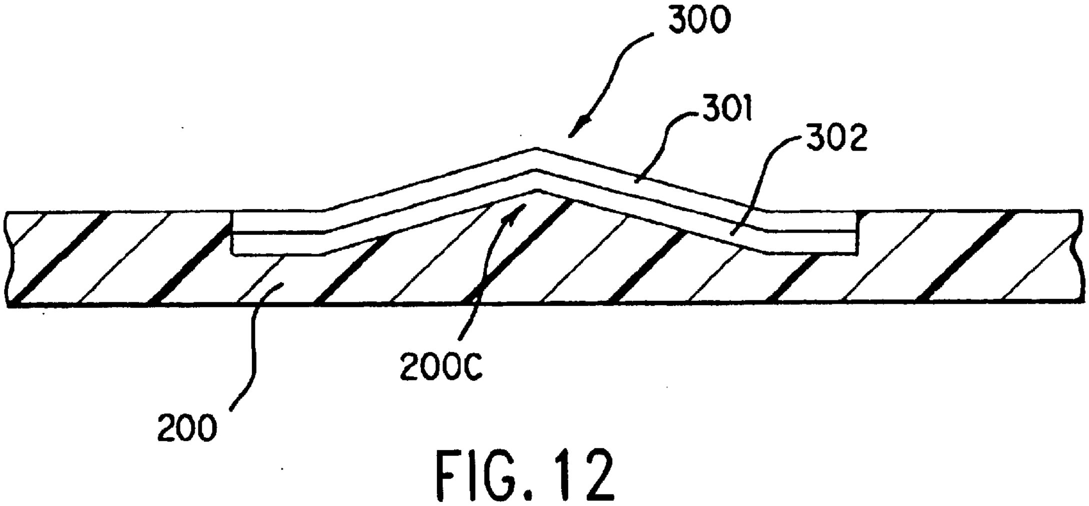
FIG. 12 illustrates an alternative embodiment for a tacky insert portion and base portion with a water dissipating capability for the floor mat of the present invention.

FIGS. 11 and 12 illustrate alternative embodiments for the floor mat of the present invention that provide a water dissipating capability for the tacky portion. As will be discussed, the embodiment of FIG. 11 also helps to prevent a person from slipping on a potentially wet tacky portion.

FIG. 11 illustrates an embodiment for tacky portion 300 where the tacky layers 301 and 302 of the tacky portion define a plurality of apertures 300C therein. The apertures of each layer are aligned with the apertures of each other layer. Thus, because of the aligned apertures in the layers, the tacky portion is able to drain surface water from the top-most surface of the tacky portion, or from the soles of a person's shoes that is standing on the tacky portion, through the apertures and to the base portion, within which the layers may be positioned. The base portion, as discussed previously, may include a water dissipation component and/or a water absorbing component which would move and/or absorb the surface water drained from the tacky portion through the apertures.

The apertures would also provide for helping to prevent slipping on a wet surface of the layers, not only by draining surface water from the surface, but by also providing for enhanced frictional contact between the shoes of the person stepping on the layer and the layer itself. The apertures provide for discontinuities in the surface of the layer which would enhance the frictional contact between the person's shoes and the layer. The edges of the surface of the layer which define the apertures would provide for this enhanced contact. The person's shoes would engage with the edges, thus enhancing frictional contact for the shoes. Additionally, the apertures would act as a suction on the bottoms of the person's shoes, e.g., like suction cups. This suction caused by the apertures on the person's shoes would also help to prevent slippage on the surface of the layer.

FIG. 12 illustrates another embodiment for the floor mat of the present invention that also provides a water dissipating capability for the tacky portion. As can be seen, tacky portion 300 includes layers 301 and 302. Base portion 200 defines a recess where layers 301 and 302 are disposed within the recess. A surface of the base portion that defines a bottom of the recess includes a raised portion 200C at or near a center position within the recess. Thus, the raised portion 200C of the base portion forms a raised portion in each of the layers. As can be understood, the raised portion formed in the layers acts to dissipate surface water on the layers from the layers. The surface water will drain off of the layers under the force of gravity due to the raised portion.

Again, any number of layers may be included in tacky portion 300 in the embodiments of FIGS. 11 and 12.

It is also contemplated that a water absorbing powder, such as a talcum powder, could be provided in the present invention. The powder could either be integrated into the floor mat or be separately associated with the floor mat. The talcum powder would remove moisture from the soles of a person's shoes when the person stepped into the powder and the tacky insert portion could then remove the powder from the person's soles, in addition to any dirt on the soles, when the person next steps on the tacky insert portion.

Figure 13:
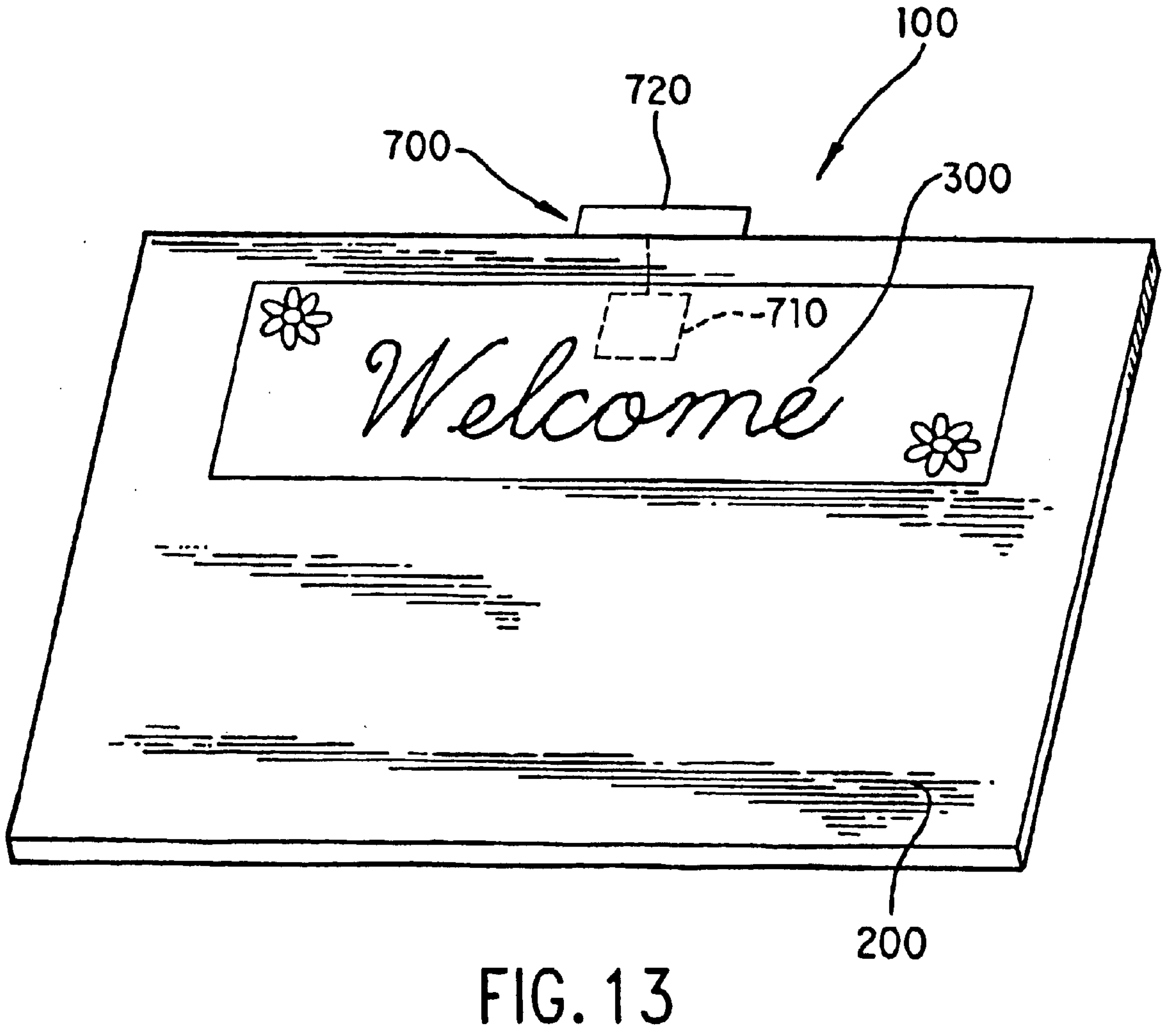
FIG. 13 illustrates a sensor system that may be utilized in an embodiment of the present invention.

The present invention also provides an apparatus and method for determining when the tacky portion, or a layer in the tacky portion, should be removed for cleaning. Since the tacky portion assists in removing dirt from the soles of the person's shoes that steps on the tacky portion, the tacky portion, or a layer thereof, will become dirty after some number of persons step on the it, assuming that any particular person's shoes are not exceptionally dirty. Therefore, it would be desirable to assist a person in deciding when to remove a dirty tacky portion for cleaning. Again, as discussed above, this determination can be made after a certain number of persons step on the mat. Thus, an embodiment of the present invention as illustrated in FIG. 13 includes a sensor system 700 that detects the presence of a person on the floor mat 100. The sensor system 700 may detect the presence of a person on base portion 200 and/or tacky portion 300. Since it is assumed that a person who steps on base portion 200 will also step on tacky portion 300, sensing the person's presence on either portion is sufficient for practicing the present invention.

Sensor system 700 includes a sensor 710 and a display device 720, e.g., an LED, coupled to sensor 710 and disposed on mat 100 such that it can be viewed. A power source, such as a battery, may be included on an underside of the floor mat. As mentioned above, sensor 710 senses the presence of a person on mat 100, e.g., in this embodiment on tacky portion 300. The sensor can detect the person's presence by utilizing any of a variety of apparatuses and methods and can include sensing the pressure applied to the mat by the weight of the person standing on the mat or by sensing the motion across the surface of the mat by the movements of the person. Thus, pressure sensors and motion detectors may be utilized in the present invention. Sensor system 700 also determines the number of persons that have stepped on the mat 100 by counting the number of sensed presences. After the number of presences equals a defined number of presences, a signal is provided to display device 720, e.g., illuminating the LED, which indicates that the tacky portion should be removed for cleaning. The present invention is not limited to removing the tacky portion at any particular number of sensed presences and the number may be adjusted based on the particular environmental conditions in which the mat is utilized. Of course, as can be understood, after the dirty tacky portion or layer is removed and/or cleaned the sensor system can be reset to begin counting the total number of presences on the newly cleaned or exposed layer.

Alarm device 720 can provide either a visual, audible, or vibratory signal and the present invention is not limited to providing any particular type of signal. For example, a visual signal could consist of a light that is illuminated when the floor mat should be cleaned and that is not illuminated when the floor mat does not require cleaning. Alternatively, the light could be continuously illuminated in one of a plurality of different colors, with each color signifying a different state of cleanliness for the floor mat. For example, a green light could signify that the mat does not need cleaning. A yellow light could indicate the mat is reaching a state of dirtiness that will soon require cleaning. A red light, which could blink on and off, could signify that it is time to clean the floor mat.

The sensor system of the present invention may be utilized with any of the embodiments disclosed for the cleanable portion, which may or may not be an insert and may or may not include layers and a tacky surface(s), and the base portion.

Whereas cleanable portion 300 has been discussed as an insert portion, it is not required that cleanable portion 300 be inserted into floor mat 100. There exists many alternative possibilities for associating cleanable portion 300 with floor mat 100. For example, cleanable portion 300 could be placed on top of base portion 200 or could be positioned adjacent to base portion 200. The present invention is not limited to inserting any of the embodiments for cleanable portion 300 within base portion 200.

Figure 14:
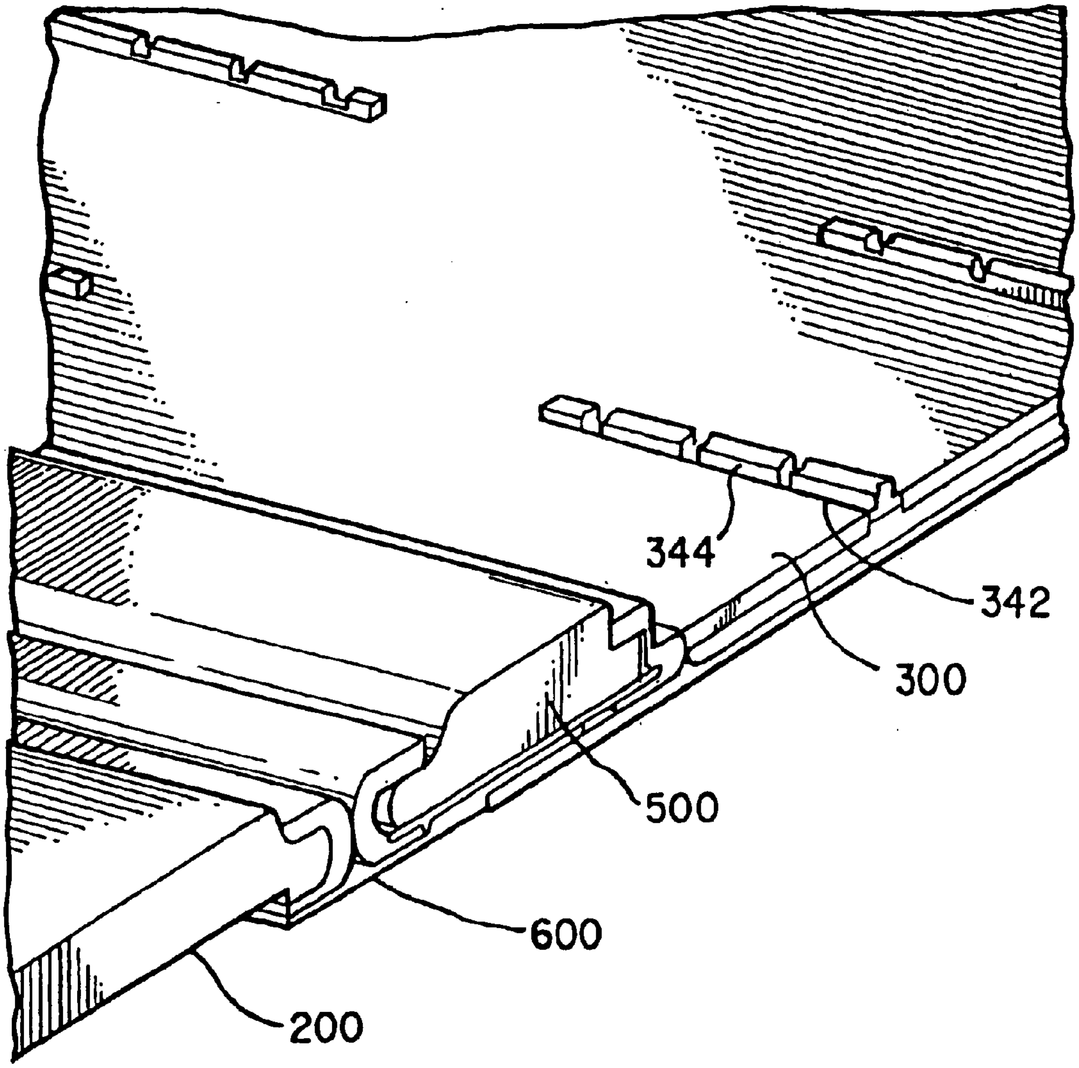
FIG. 14 is an embodiment for a floor mat where the tacky portion and the non-tacky portion are separable.

For example, FIG. 14 illustrates a tacky portion 300 and a non-tacky portion 200, which may include a water dissipation component, a water absorbing component, and a cushioning component, as discussed previously, that are separable. As can be seen in FIG. 14, tacky portion 300 may be bordered within a border 500, which may be water absorbent, water dissipative, and include a cushioning component, and may include a plurality of apertures 342 and treads 344 within it. Tacky portion 300 can include any of the embodiments previously discussed. An attachment layer 600 is positioned on an underside of both border 500 of tacky portion 300 and non-tacky portion 200. The border 500 and/or non-tacky portion 200 may be releasably attached to attachment layer 600. Thus, through attachment layer 600, border 500, and therefore tacky portion 300, and non-tacky portion 200 are releasably attachable to each other. In this manner, it is possible to, for example, position non-tacky portion 200 outside of a person's home on the front porch and tacky portion 300 within the person's home.

Attachment layer 600 can be any of a variety of materials. All that is required is that the attachment layer be able to releasable join one portion of the floor mat to a second portion of the floor mat. For example, a hook and loop fastener assembly, e.g., Velcro®, can be used with one portion of the assembly on the attachment layer and the other portion on the underside of the first portion of the floor mat and the second portion of the floor mat. Alternatively, an adhesive can be utilized to releasably join the two portions of the floor mat to the attachment layer. Additionally, snaps, including any type of male/female connector, may be used to join the two portions to the attachment layer.

Figure 15:
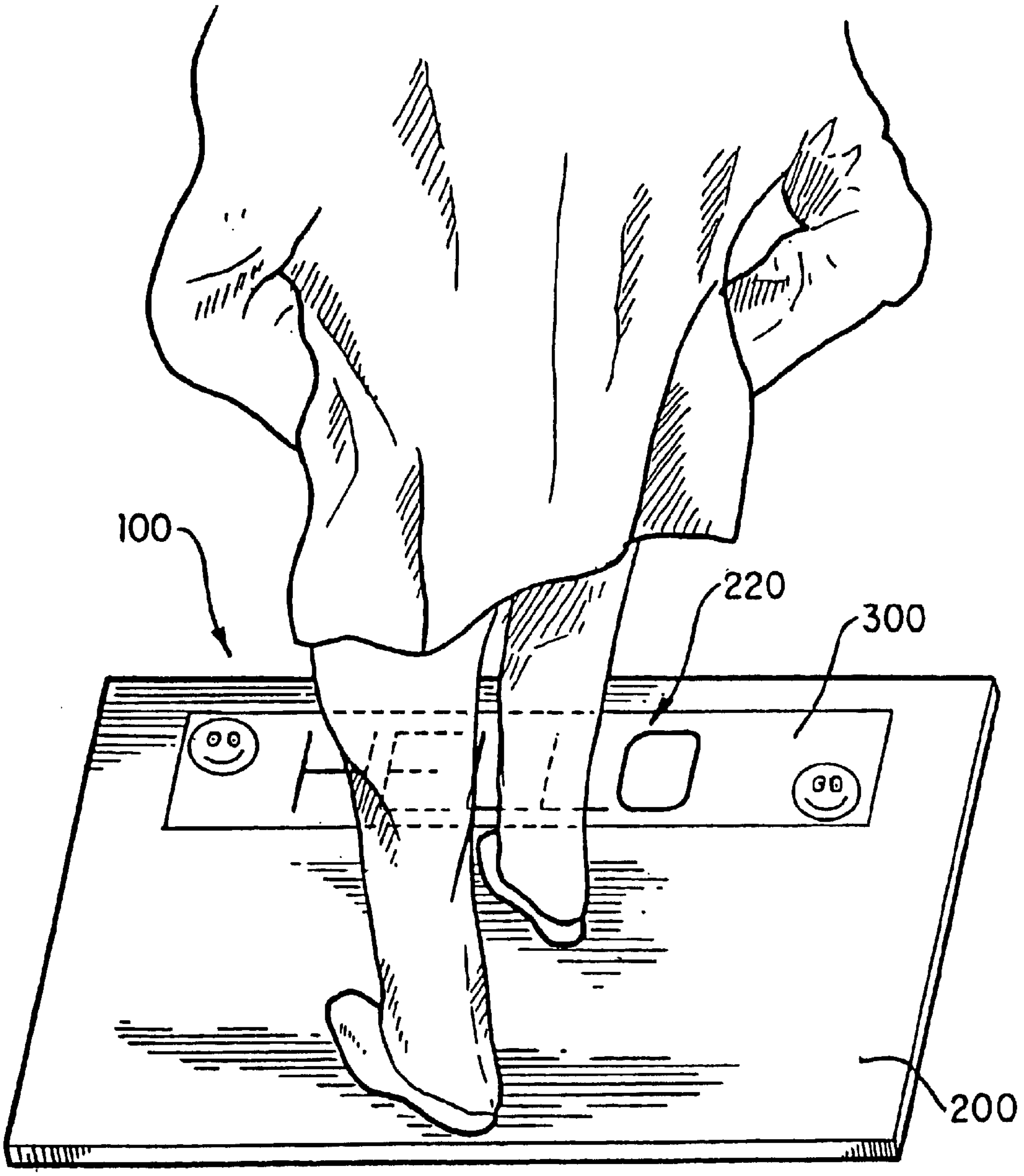
FIG. 15 is a perspective view of an embodiment of the floor mat of the present invention as being used in one step of a process for utilizing the floor mat.

FIG. 15 illustrates a first process step in utilizing an embodiment of the floor mat 100 of the present invention. As was described previously, an embodiment of floor mat 100 includes a base portion 200 and an insert portion 300. As can be seen in FIG. 15, and as was also discussed previously, a different graphic display 220 is present in the embodiment of FIG. 15 than was illustrated in the embodiment of FIGS. 1 and 2. Thus, FIG. 15 displays a "Hello" message with "smiley face" representations in the graphic 220.

As can be seen in FIG. 15, in utilizing an embodiment of the present invention, a user would first step upon base portion 200. As discussed earlier, base portion 200 may include a water dissipating and/or absorbing component and is thus able to assist in removing any moisture from the soles of the person's shoes. As was also discussed earlier, because base portion 200, in one embodiment, also includes a cushioning component, base portion 200 conforms to the person's soles when the person steps upon base portion 200. Whereas not illustrated in FIG. 15, as discussed previously, an antibacterial composition, an antifungal composition, a fragrance, or any other cleaning substance may also be associated with floor mat 100 and applied to the soles of the person's shoes when the person applies pressure to floor mat 100.

Figure 16:
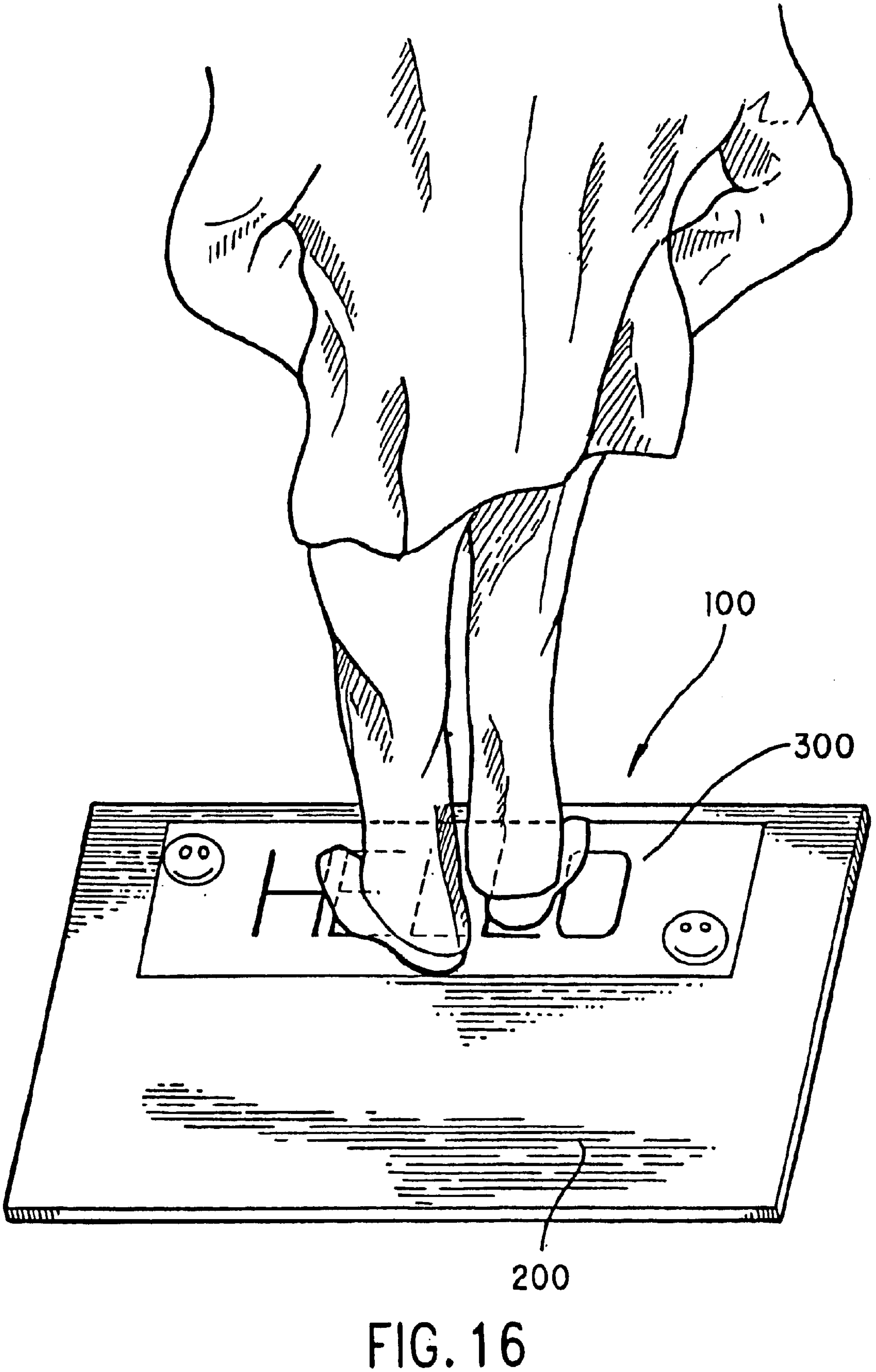
FIG. 16 is a perspective view of the floor mat of FIG. 15 as being used in a second step of a process for utilizing the floor mat.

As can be seen in FIG. 16, the second process step in utilizing the present invention includes the person stepping onto insert portion 300 of floor mat 100. As discussed previously, insert portion 300 may include a tacky surface on a top side thereof for assisting in removing debris from the soles of the person's shoes. Additionally, antibacterial compositions, antifungal compositions, fragrances, or other cleaning compositions may also be included within insert portion 300 for dispensing to the soles of the person's shoes.

After the person steps onto insert portion 300, the user then steps off of floor mat 100. As described previously, floor mat 100 may be cleaned after an accumulation of dirt on insert portion 300 by any of the methods described previously. Insert portion 300 may be removed from base portion 200 and cleaned, a layer may be removed from insert portion 300 to be cleaned or discarded, or insert portion 300 may be cleaned through erosion of insert portion 300. The present invention is not limited to any particular methodology for cleaning insert portion 300 of floor mat 100.

Figure 17:
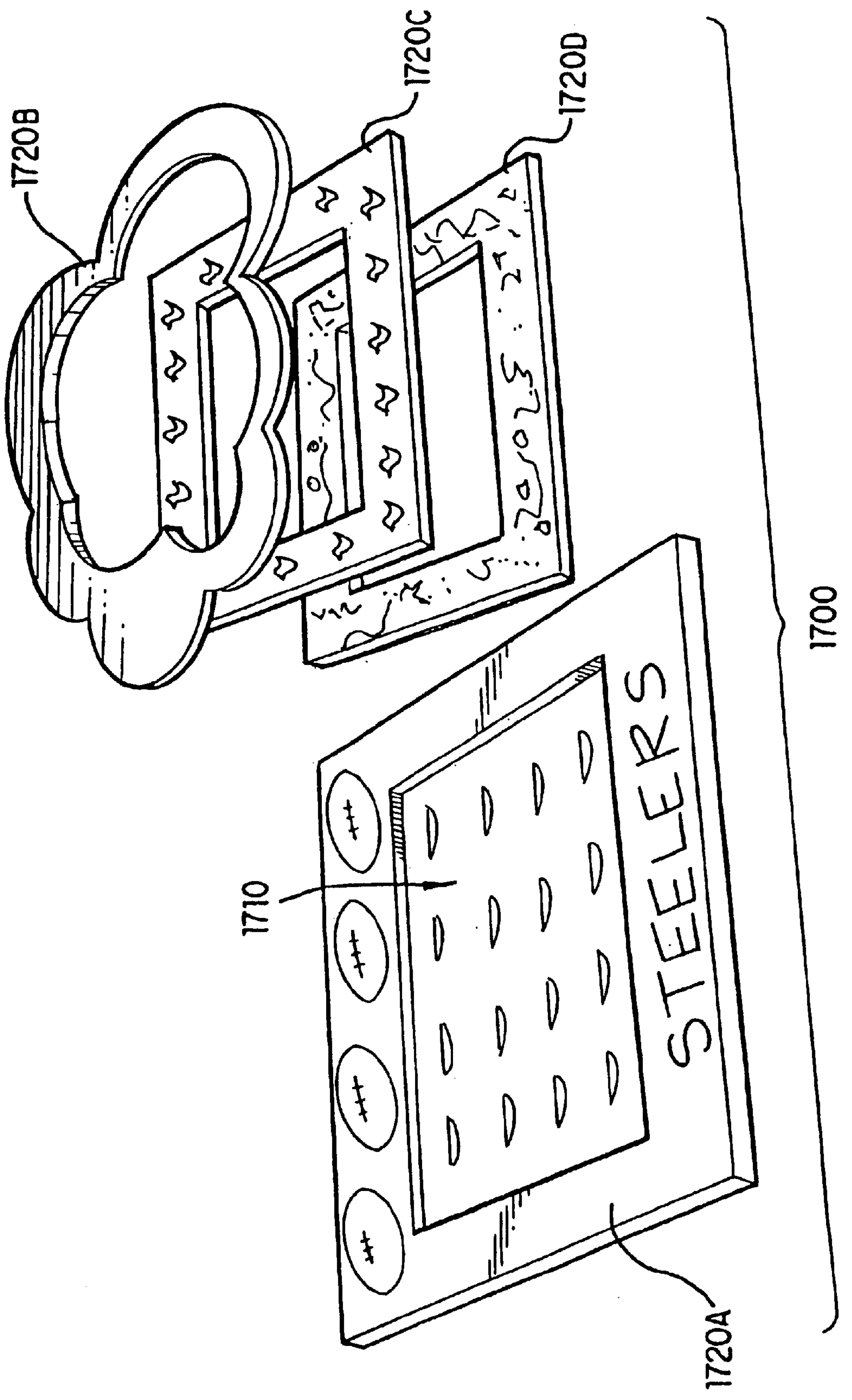
FIG. 17 illustrates an alternative embodiment for a floor mat in accordance with the present invention that includes interchangeable base portions.

FIGS. 17–22 illustrate further alternative embodiments for the floor mat of the present invention. As can be seen in FIG. 17, in this embodiment for the floor mat, floor mat 1700 includes a cleanable portion 1710 and a plurality of base portions 1720A–D. As can be seen, cleanable portion 1710 is positioned within one of base portions 1720A–D. In this manner, the floor mat 1700 can be customized for a particular user by interchanging the cleanable portion 1710 with one of a variety of base portions 1720A–D. The base portions 1720A–D can be formed in any of a variety of physical configurations and can include any of a variety of themes, graphics, or colors. Thus, a common cleanable portion 1710 may be utilized with a variety of base portions 1720A–D.

Figure 19:
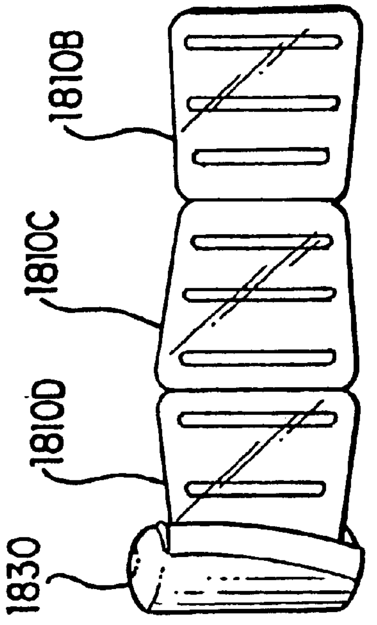
FIG. 19 illustrates a roll of sheets that may be utilized with the embodiment of FIG. 18.
Figure 18:
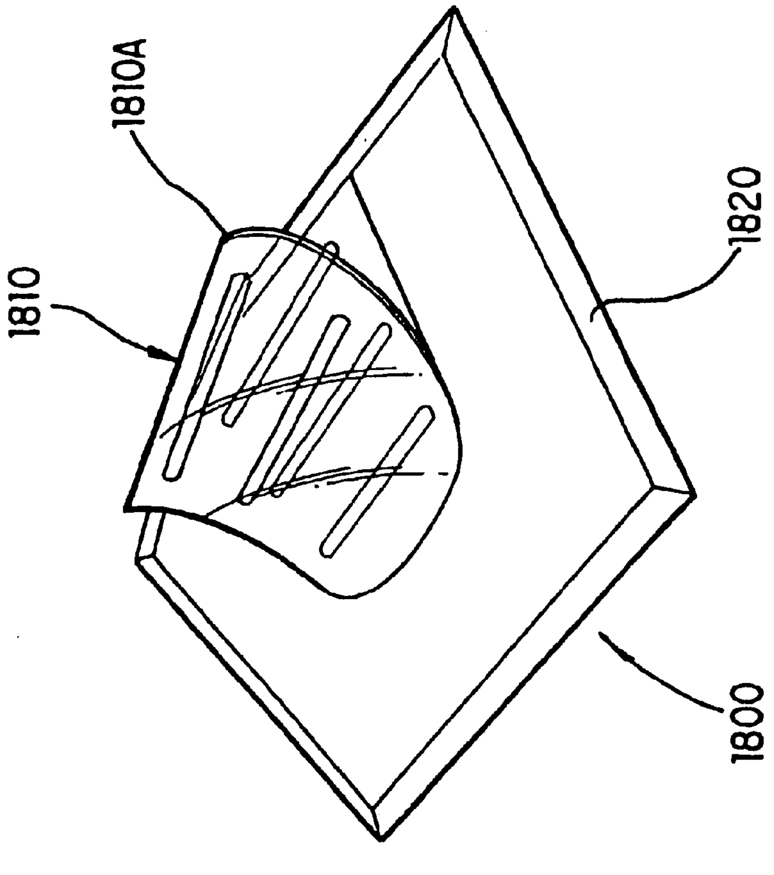
FIG. 18 illustrates an alternative embodiment for a floor mat in accordance with the present invention that includes single sheets for the cleanable portion.
Figure 20:
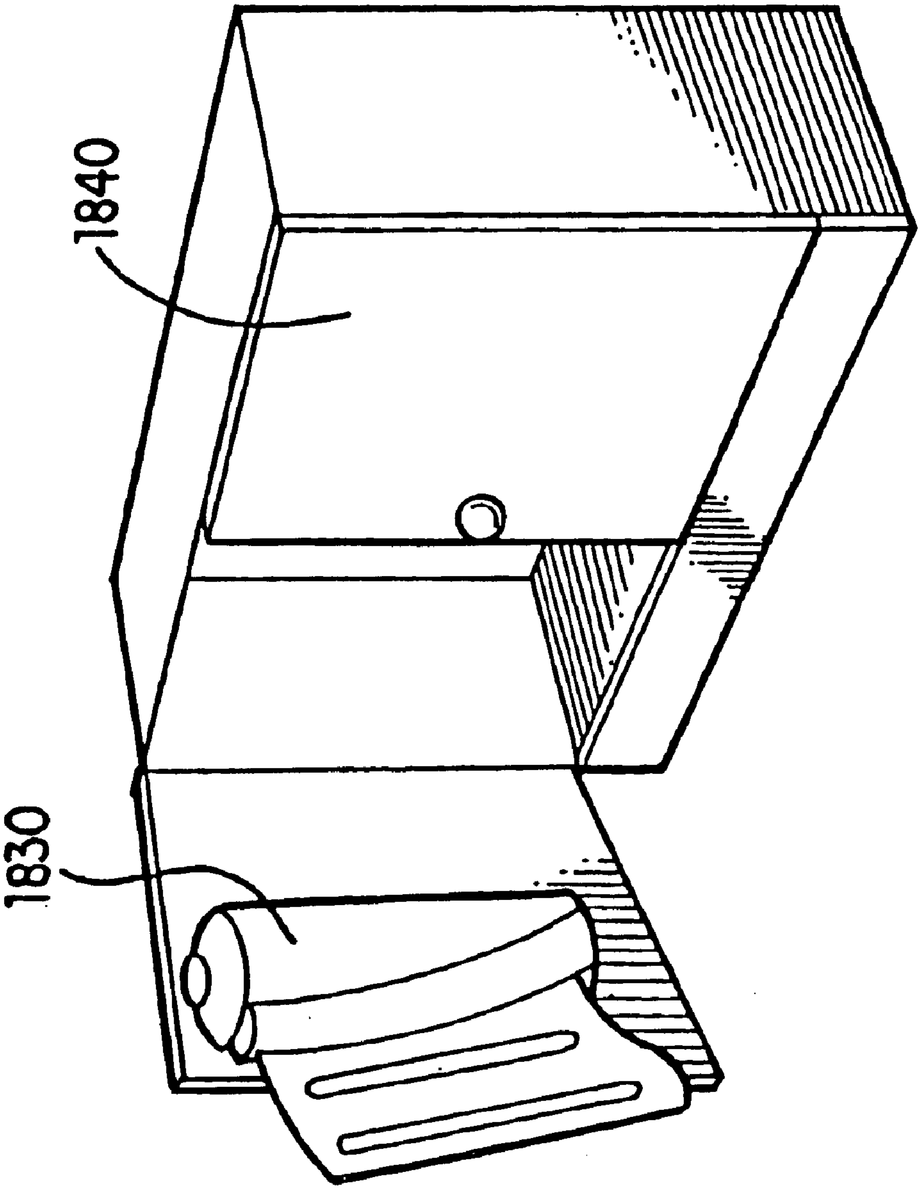
FIG. 20 illustrates a storage container that may be utilized with the roll of sheets of FIG. 19.

FIGS. 18–20 illustrate another alternative embodiment for a floor mat 1800 in accordance with the principles of the present invention. As can be seen in FIG. 18, floor mat 1800 also includes a cleanable portion 1810 and a base portion 1820. As discussed previously, cleanable portion 1810 is received within base portion 1820. In this embodiment, cleanable portion 1810 is comprised of a single sheet 1810A. The single sheet 1810A may be tacky on a top-side thereof and may include apertures therein to receive anti-slip nipples though it, as was also discussed previously. The single sheet 1810A, in this embodiment, may be removed and replaced with another sheet when dirty.

FIG. 19 illustrates that a plurality of sheets 1810B–D, may be attached to each other and rolled into a roll 1830 of sheets. The sheets can be joined to each other at a perforated joint to provide for ease in separating a sheet from the roll of sheets. As can be understood, a sheet may be separated from the roll of remaining sheets and may be then inserted into base portion 1820.

FIG. 20 illustrates that the roll of sheets 1830 may be stored in a storage device 1840, such as, for example, by mounting the roll of sheets 1830 on a cabinet door, which may be located in proximity to the floor mat. In this manner, replacements sheets are easily organized and stored for use.

Alternatively, instead of organizing the sheets in a roll and storing the roll in a cabinet, the sheets could be folder one upon another such that they form a flat package. The package of sheets could then be stored underneath of the floor mat 1800 where individual sheets could be removed from the package and from under the floor mat, when needed, similar to the way a Kleenex® tissue is dispensed.

Figure 21:
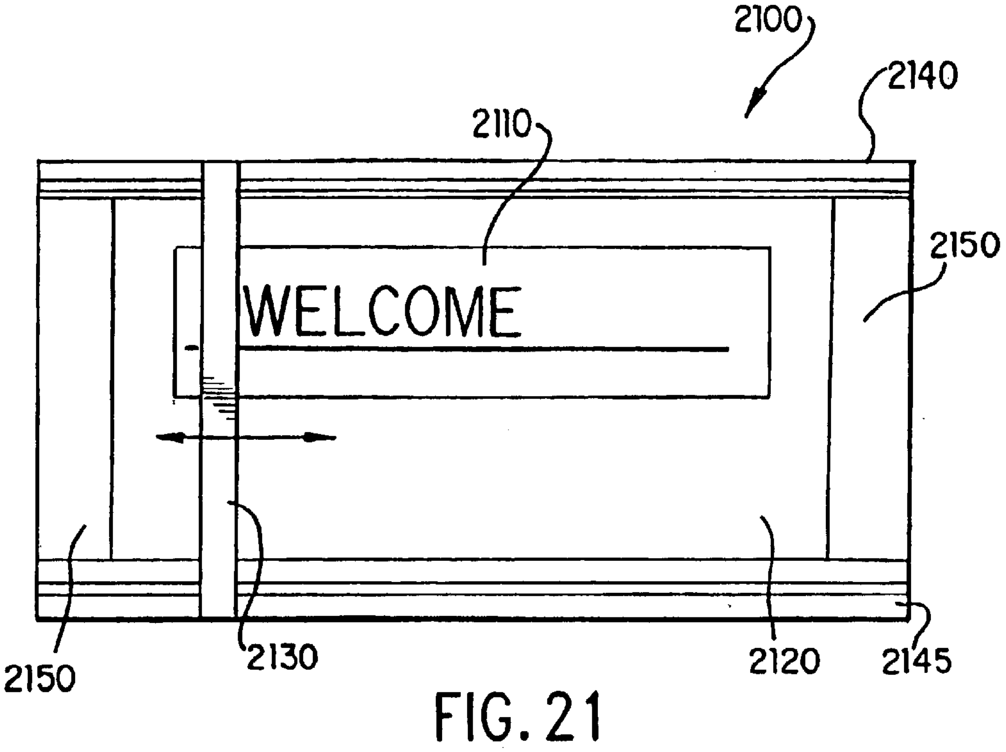
FIG. 21 illustrates an alternative embodiment for a floor mat in accordance with the present invention that includes a scraper movable on tracks.

FIG. 21 illustrates another alternative embodiment for a floor mat in accordance with the present invention. Floor mat 2100 also includes a cleanable/scrapable portion 2110 and a base portion 2120. In this embodiment, cleanable portion 2110 is formed, as discussed previously in this application, as a single structural member from a material which is tacky in composition throughout the entire cross-section of the material. As was also discussed previously, by forming portion 2110 from a uniform, tacky material, the portion 2110 does not necessarily have to be removed from the base portion 2120 to be cleaned. However, in the embodiment previously discussed, the cleanable portion 2110 could be cleaned by eroding the top surface of the insert portion as a result of use of the insert portion. In the embodiment of FIG. 21, the cleanable portion is cleaned by scraping off a top surface of approximately 2–3 microns from the cleanable portion 2110 by utilizing a scraper 2130.

Scraper 2130 can include any of a variety of structures, however, all that is required is that the scraper be capable of removing a top surface from cleanable portion 2110. For example, any type of scraping surface can be utilized in scraper 2130, such as, for example, a dull knife, a razor, or a plane.

Scraper 2130 is movable on tracks 2140, 2145. Tracks 2140, 2145 are adjacent to cleanable portion 2110 and base portion 2120. Scraper 2130 may include wheels or other structures, e.g., pins, which are received within complementary structures, e.g., grooves, in tracks 2140, 2145. Thus, scraper 2130 is movable across cleanable portion 2110 on tracks 2140, 2145. The scraper 2130 may only include a scraping surface on the portion of scraper 2130 that is movable across cleanable portion 2110. Additionally, it is not required that two tracks be utilized. The scraper could be movable within a single track.

Scraper 2130 may be moved by any of a variety of methods, including using the foot of a user to engage with the scraper to move the scraper on the tracks.

Floor mat 2100 also includes a catch basin 2150 that may be included at one or both ends of tracks 2140, 2145. Catch basin(s) 2150 includes a recess into which is deposited the shavings from cleanable portion 2110 after scraper 2130 scrapes the cleanable portion. Scraper 2130 moves the shavings off of the cleanable portion and into the catch basin 2150. The shavings from the cleanable portion deposited into the catch basin may be removed from the catch basin in any of a variety of ways, including, for example, by vacuuming the shavings from the catch basin or removing a detachable catch basin, throwing away the contents from the catch basin, and reinstalling the catch basin.

As can be understood, as the cleanable portion is shaved, the scraper is commensurately lowered on tracks 2140, 2145 such that the surface of the scraper that engages with the cleanable portion remains engaged with the cleanable portion. As such, for example, the scraper may be mounted on a ratchet mechanism such that, as the scraper is moved across a complete width of the floor mat, the scraper actuates the ratchet such that the ratchet lowers the scraper. Alternatively, the scraper could remain in the same relative position with respect to the tracks and the tracks could be ratcheted lower with respect to the base portion and cleanable portion. Additionally, the blade surface of the scraper could be lowered with respect to the scraper's structure such that the blade is moved relative to the cleanable portion and the base portion but the scraper remains in the same relative position with respect to the tracks and the cleanable portion and the base portion.

Figure 22:
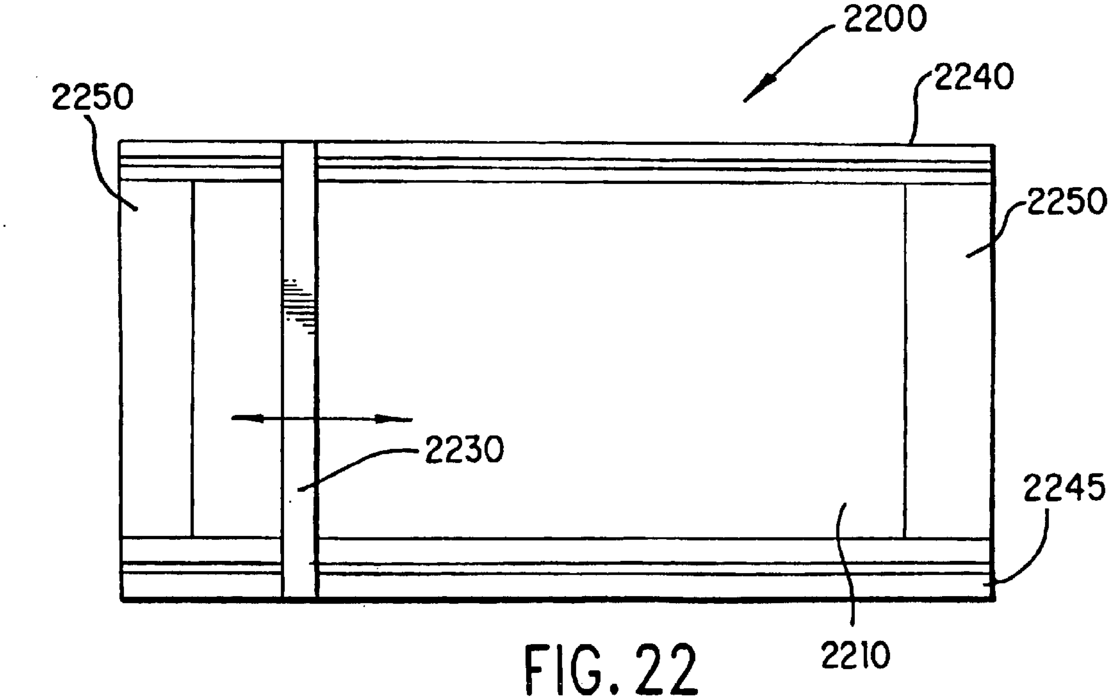
FIG. 22 illustrates an alternative embodiment for a floor mat in accordance with the present invention that includes a scraper movable on tracks.

Additionally, it is not required that a base portion be utilized in the embodiment for floor mat 2100. The cleanable portion alone can be utilized with the tracks adjacent the cleanable portion and the scraper movable on the tracks. A catch basin(s) could still be utilized. As such, FIG. 22 illustrates an embodiment for floor mat 2200 that includes a cleanable portion 2210 without use of a base portion. Cleanable portion 2210 is adjacent to tracks 2240, 2245. Scraper 2230 is movable on tracks 2240, 2245. A catch basin 2250 may be included at one or both ends of tracks 2240, 2245.

As discussed above, there is no known single chemistry which provides a tacky surface which is tacky both when wet and when dry, and yet not too tacky under either condition. Accordingly, in still further alternative embodiments of the present invention, a dual chemistry may be used for the tacky surface. The dual chemistry combines adhesive compositions of two different types. Adhesive compositions of one type are optimally adhesive when dry. Adhesive compositions of the other type are optimally adhesive when wet. In combination, the adhesive compositions of the two types can be used to provide a top exposed surface that is optimally tacky both when wet and when dry. Thus, when a person's shoe comes in contact with the top exposed surface, the surface provides good tackiness when the surface is either dry or wet, and helps to prevent the person from slipping when the surface is wet.

By "optimally tacky" as used in the foregoing, it is meant that, while either of the two types of adhesive compositions may retain some tackiness when either dry or wet, one type has a best or serviceable level of tackiness under dry conditions, while the other type has a best or serviceable level of tackiness under wet conditions.

A material that comprises the two types of adhesive compositions and presents the top exposed tacky surface that comes in contact with a shoe could assume a variety of embodiments. For example, the dual-chemistry top exposed tacky surface could be the surface of a tacky "insert" or "portion," such as insert 300 described in the foregoing, designed to cooperate with a non-tacky base portion.

On the other hand, the dual-chemistry top exposed tacky surface might not be a surface of a tacky "insert" or "portion" as such. Rather, the dual-chemistry top exposed tacky surface could be the substantially the entirety of the usable surface of an independent floor mat.

Whether the dual-chemistry tacky surface is used in combination with a non-tacky portion, or whether it is substantially the entirety of the usable surface of an independent floor mat, a separate structural member for an anti-slip component does not need to be used in conjunction with the tacky surface to prevent slipping on the tacky surface when the tacky surface becomes wet. On the other hand, if desired, a separate structural member for an anti-slip component could be used with the tacky surface.

Generally, the material that presents the tacky surface comprises a combination of components having chemistries that respectively are optimally tacky when dry or optimally tacky when wet, such that the combination as a whole presents a top exposed tacky surface that retains a serviceable level of tackiness when either wet or dry. More particularly, when the tackiness of components having a chemistry which is optimally tacky when dry is reduced due to the presence of moisture, the loss of tackiness is compensated for by the components having a chemistry which is optimally tacky when wet. On the other hand, when the tackiness of components having a chemistry which is optimally tacky when wet is reduced due to the absence of moisture, the loss of tackiness is compensated for by the components having a chemistry which is optimally tacky when dry The components could be combined in a pattern of alternating regions with tacky-when-dry properties and tacky-when-wet properties, respectively. The components could be combined such that the composite material is segmented into regions with distinct characteristics such that the material has a substantially non-uniform composition. On the other hand, the components could be combined with a fine granularity, such that the material has a substantially uniform composition.

Figure 23:
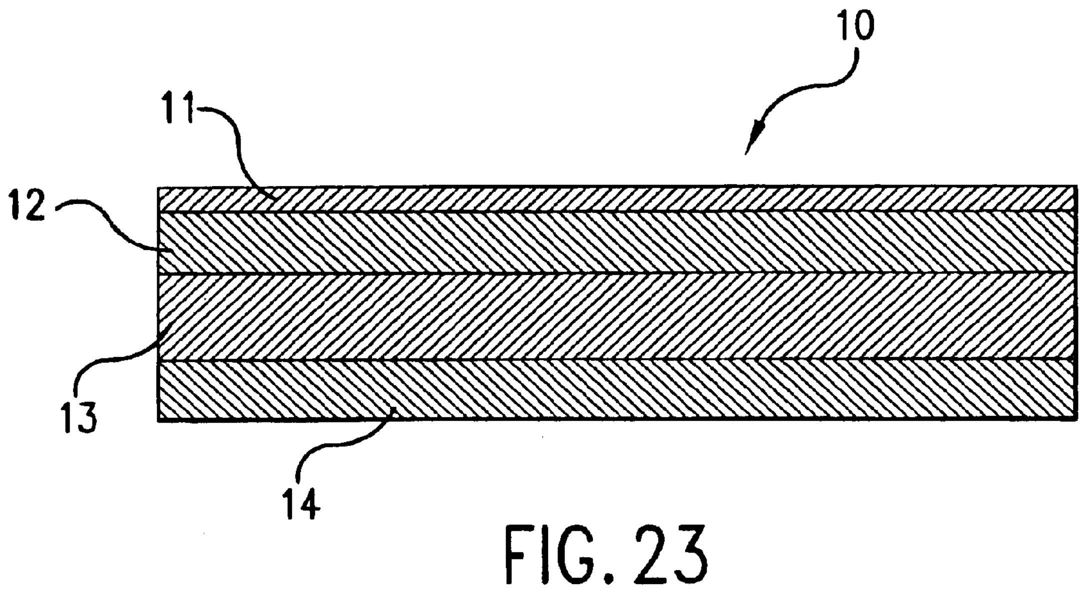
FIG. 23 illustrates an alternative embodiment for a tacky surface in accordance with the principles of the present invention.

FIG. 23 illustrates one possible embodiment of a multi-layer assembly 10 including a material that presents a top exposed tacky surface that is tacky when either wet or dry. The layers include a top layer 11, which comprises a material that presents a top exposed tacky surface that is tacky both when wet and when dry. The material comprises at least three types of distinct "domains." A "domain," with respect to a composition of the top layer 11, refers to a discrete constituent segment of the top layer with chemical properties distinct from other discrete constituent segments.

The domains in top layer 11 include a tacky domain with pressure-sensitive adhesive characteristics and high surface energy. This tacky domain could comprise, for example, copolymers of alkyl methacrylates and difunctional comonomers such as acrylamides, epoxy acrylates, or urethane terminated acrylates and pressure-sensitive polysiloxane derivatives.

A second domain of the top layer 11 is a non-tacky hydrophobic domain of low surface energy. This non-tacky hydrophobic domain could comprise, for example, polyalkyl fluroacrylates, acrylic terminated fluoroacrylamides, or fluorosulfonamides, polysiloxanes derivatized with one or two acrylate groups, celluloses derivatized with acrylates, styrene butadiene copolymers or acyclic acrylates or methacrylates. The methacrylates could include, for example, cyclohexane methacrylate, norbornene methacrylate, or isobornyl methacrylate.

A third domain of the top layer 11 is a hydrophilic domain. The hydrophilic domain could comprise, for example, hydroxyethyl methacrylate, polyacrylic and methacrylic acids and their salts, polyvinyl alcohol, polyoxymethylenes, polyamides, polyesters and polyimides of unsaturated dicarboxylic acids.

In the top layer 11, tacky domains could be cross-linked, and hydrophilic domains could be cross-linked, with a cross-link density, respectively, ranging from 5–20 mole percent. The material of the top layer is either in an elastomeric or a leathery state in a range of temperatures in which the floor mat would be in service. A desired range of glass transition temperatures is 5–25° C.

In the top layer 11, a plurality of tacky domains are interspersed with a plurality of hydrophilic domains. The hydrophilic domains modulate the overall tackiness of the top layer 11, by causing a tackiness of the top layer 11 in a dry state to be substantially equal to a tackiness of the top layer 11 in a wet state.

A function of the hydrophobic domains of low surface energy is to prevent the formation of a continuous film of water over the top layer, and therefore increase the rate of drainage. The hydrophobic domains also enhance the pressure dependency of the tackiness of the top layer, thereby reducing tackiness in the absence of a force. This can help to prevent excessive tackiness when pressure is applied as the floor mat is actually being used, and to prevent the tacky surface collecting an excessive amount of airborne particulate matter.

The overall morphology of polymeric layer 11 is miceller, with the hydrophobic domains being substantially at or near the surface of the layer, and the hydrophilic and tacky domains being substantially below the surface of the layer. The hydrophilic and the tacky domains migrate to the surface under wet conditions, and together, provide the tackiness needed to attract dirt, bacteria and the like from footwear or other surface to be cleaned, and to help prevent slipping on the tacky surface when it is wet.

In fabricating the top layer 11, domain formation can be enhanced through the use of solvent-induced crystallization. Depending upon the chosen method of manufacturing or assembly of the tacky portion, further enhancements may be possible through selective orientation of the domains during the extrusion, laminating or application process of the top layer 11.

In addition to a top layer 11 as described above, the multi-layer assembly 10 could also include at least one hydrophobic layer 12. On one side thereof, the hydrophobic layer 12 could be adjacent to the top layer 11. The hydrophobic layer 12 could be made of a hydrophobic copolymer. Examples of such a hydrophobic copolymer include methyl methacrylate copolymers, a styrene butadiene co-polymer, and polyalkyl or polyaryl siloxanes. The hydrophobic layer 12 could be bonded to the top layer 11 by means of, for example, an acrylic adhesive. The glass transition temperature of the hydrophobic layer may be in the range 5–150° C.

The hydrophobic layer 12 is designed to efficiently transport water from the top layer 11. The composition of the hydrophobic layer 12 is selected to minimize solubility of water and maximize its diffusivity in the hydrophobic layer 12. Polysiloxanes as constituents of the hydrophobic layer 12 are especially desirable from this point of view. It is also important to minimize the swelling characteristics of the hydrophobic layer 12 in the presence of water, because the desired function of this layer is to promote drainage and remain relatively dry.

On a side opposite the side adjacent to the top layer 11, the hydrophobic layer 12 may be adjacent to a hydrophilic layer 13 made of polyvinyl alcohol, polyoxymethylenes, polyhydroxy esters or amides. The cross-link density of this hydrophilic layer 13 could be between 10–30 mole percent, and its glass transition temperature could be in the range −30° C. to 10° C.

The hydrophilic layer 13 is capable of absorbing water transported to it by the hydrophobic layer 12. The hydrophilic layer 13 may be adhesively bonded to adjacent layers. Absorption of water by the hydrophilic layer increases its thickness. The composition and cross-link density of the hydrophilic layer may be selected so that this layer can hold up to twice its weight in water (swelling ratio 200%). A function of the hydrophilic layer is to act as a reservoir of water, when removal of water through evaporation is slow. At the same time, the cross-link density and functionality of the hydrophilic layer is carefully controlled so that it does not unduly retain moisture.

The multi-layer assembly 10 could further include a bottom layer 14 for contact with a floor. The bottom layer 14 could be made of a wear-resistant, anti-skid polymer such as a polyurethane, a styrene butadiene copolymer, or a polycarbonate. Other materials suitable for forming the bottom layer 14 include acrylic terminated aromatic polyurethanes and epoxides. The bottom layer 14 could generally be cross-linked highly (e.g., 10–50 mole percent), and its glass transition temperature, when measurable, could be below 5° C. and in any case below 10C. The bottom layer 14 could be formed so as to have a high surface energy, so that it does not lose all affinity to a floor surface even in the presence of a film of water on the floor surface.

The bottom layer 14 could be especially useful if the multi-layer assembly 10 were being used as an independent floor mat. On the other hand, if the multi-layer assembly 10 were being used as an insert in combination with a non-tacky portion, the bottom layer 14 might not be present. Instead, an adhesive might be used on a surface of hydrophilic layer 13 for contacting the non-tacky portion, to ensure adhesion of the multi-layer assembly 10 to the non-tacky portion.

The top layer 11 could be about 50–500 microns in thickness. The hydrophobic layer 12 could be about 100–1000 microns in thickness, and the hydrophilic layer 13 could be about 250–1500 microns in thickness. The bottom layer 14 could be approximately 250–1000 microns in thickness.

The multi-layer assembly 10 could be embossed with a pattern to increase surface area, and could be perforated with a pattern of holes (2–10 mm in diameter) to provide drainage.

A multi-layer assembly 10 could be assembled by manufacturing each of the above-described layers separately, and then bonding them together using conventional processes. Alternatively, for example, the top layer 11 could be fabricated first, and then the other layers could be successively applied or bonded to the top layer 11 and to each other.

According to other alternative embodiments, the top layer 11 could comprise a material having a uniform composition. By uniform composition, it is meant that the material is not divided into domains, but instead is more finely grained such that the material has chemical properties that are substantially constant throughout the material. The chemical properties are such that the material can absorb water while retaining tackiness.

For example, the material of uniform composition in top layer 11 could be made of polymers, such as block copolymers or a grafted copolymer. The polymers could be pressure-sensitive adhesives coated or grafted with hydrophilic monomers followed by a further grafting of a fluoroacrylate. Alternatively, the material of uniform composition could comprise a mixture of pressure-sensitive adhesives with hydrophilic fillers such as fibers or microspheres to bind water.

Figure 24:
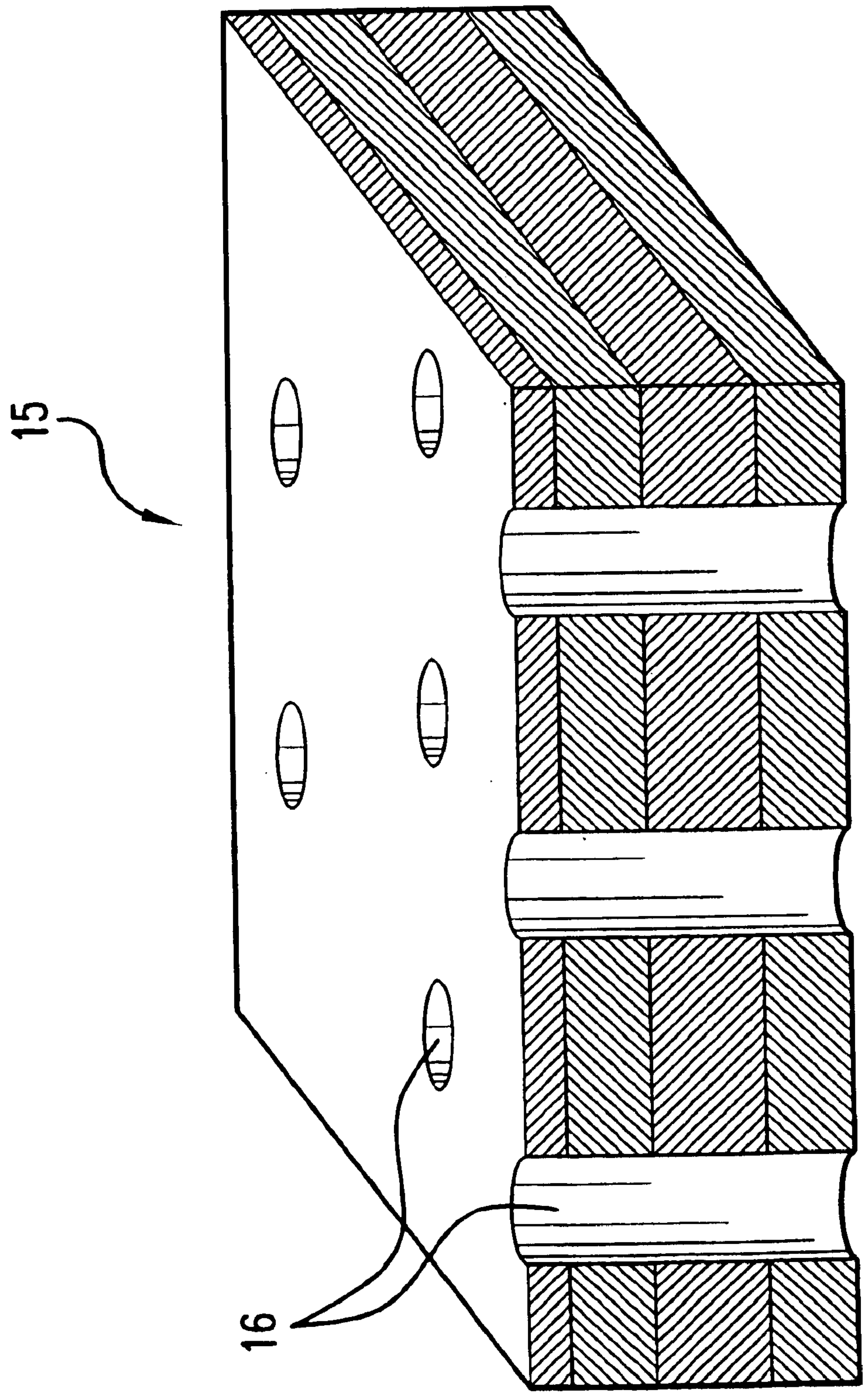
FIG. 24 illustrates an alternative embodiment for the tacky surface of FIG. 23.

As noted above, the multi-layer assembly could be perforated for improved water drainage. FIG. 24 illustrates one embodiment of a perforation pattern formed in a multi-layer assembly 15 comprising four layers as described above. Circular holes 16 are punched, cut, or drilled through all four layers. While circular holes are shown by way of example, the holes could be of any arbitrary shape.

Additional embodiments of the present invention could utilize two fundamentally different adhesive compositions arranged in some arbitrary pattern. A first adhesive composition could be pressure-sensitive and tacky when dry. A second adhesive composition could be hydrophilic and tacky when wet. The pattern could be a pattern of regions of the first adhesive composition alternating with the second adhesive composition. Examples of tacky-when-dry adhesives include poly(ethylene-co-vinylacatate) and polyvinylbutyral. Examples of tacky-when-wet adhesives include mixtures containing natural and synthetic rubbers in the presence of plasticizers mixed with hydrocolloid gums and the following class of chemistries: co-polymers of two amino ethyl ethacrylate and nbutly methacrylate.

Figure 25:
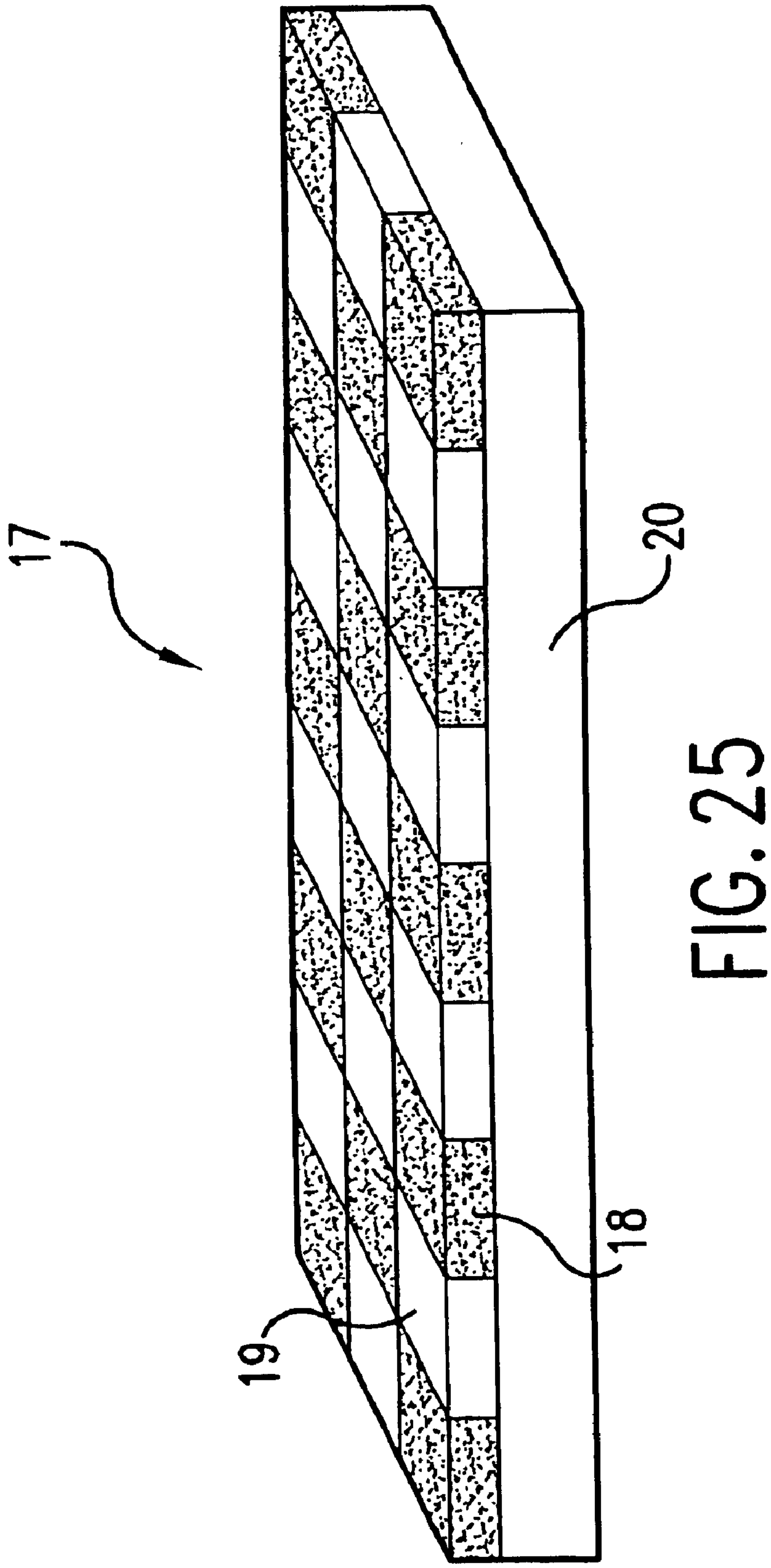
FIG. 25 illustrates another alternative embodiment for a tacky surface in accordance with the principles of the present invention.

FIG. 25 illustrates a perspective view of a cross section of a multi-layer assembly 17 utilizing two fundamentally different adhesive compositions as described above. A top layer 18 comprises a checkerboard pattern 19 of tacky-when-wet adhesives alternating with tacky-when-dry adhesives. The checkerboard pattern is shown only by way of example and other alternating patterns are contemplated in the present invention. A bottom layer 20 is a wear-resistant anti-skid layer for contacting a floor. The bottom layer 20 could be especially useful if the multi-layer assembly 17 were being used as an independent floor mat. On the other hand, if the multi-layer assembly 17 were being used as an insert in combination with a non-tacky portion, the bottom layer 20 might not be present. Instead, an adhesive might be used on a surface of layer 18 for contacting the non-tacky portion.

Figure 26:
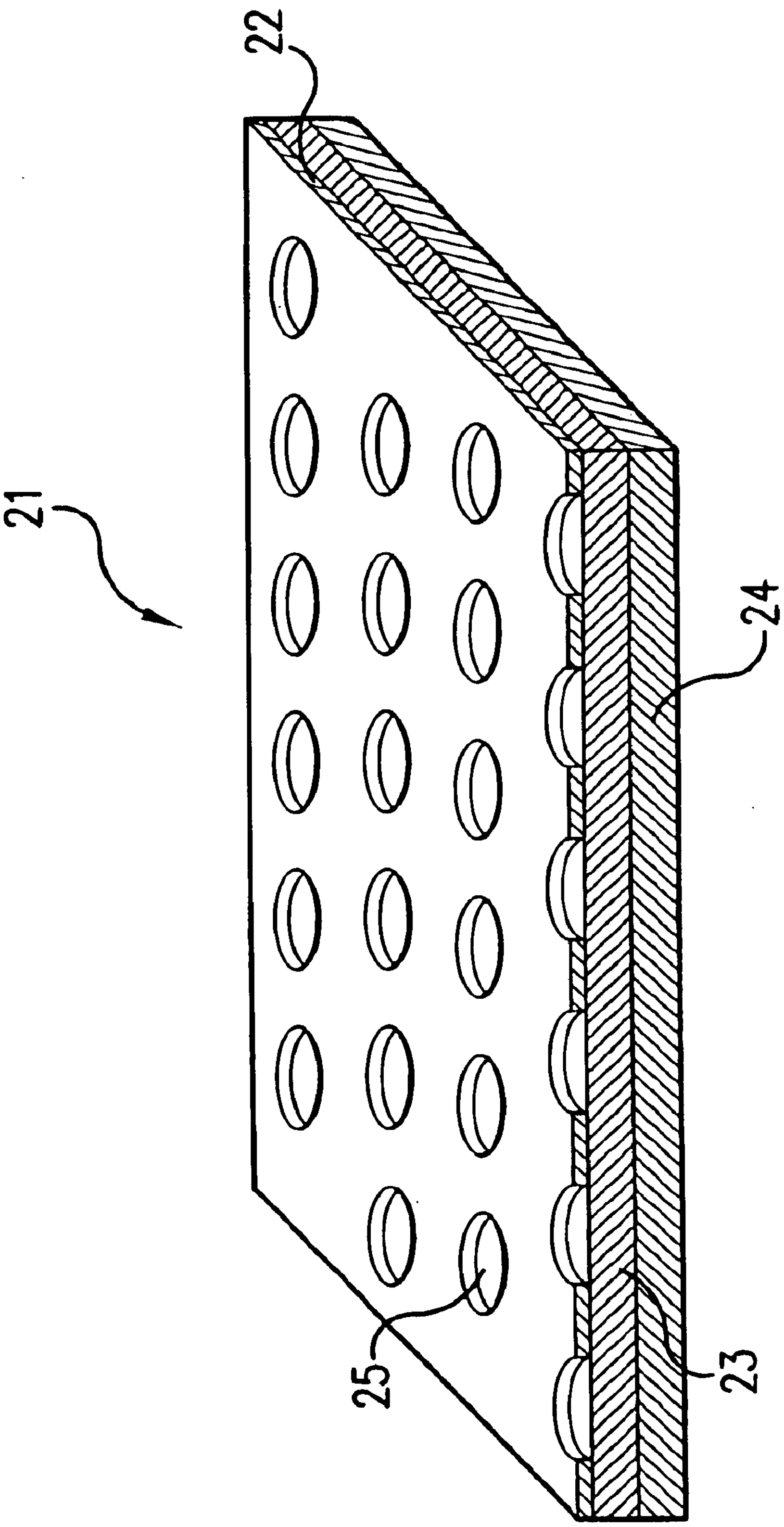
FIG. 26 illustrates another alternative embodiment for a tacky surface in accordance with the principles of the present invention.

FIG. 26 is perspective view of a cross section of a multi-layer assembly 21 illustrating yet another embodiment of the present invention. A top layer 22 comprises a tacky-when-dry adhesive. A second layer 23 comprises a hydrophilic tacky-when-wet adhesive. A bottom layer 24 is a wear-resistant anti-skid layer for contacting a floor.

Holes 25 are formed in the top layer 22 to enable contact by the sole of a shoe or other surface to be cleaned with the tacky-when-wet adhesive at the same time that the tacky-when-dry adhesive is contacted. Since the second layer 23 is also hydrophilic, it will swell and fill the holes 25 when wet, providing greater access to the tacky-when-wet adhesive of layer 23 by a surface to be cleaned, such as the sole of a shoe.

Figure 27:
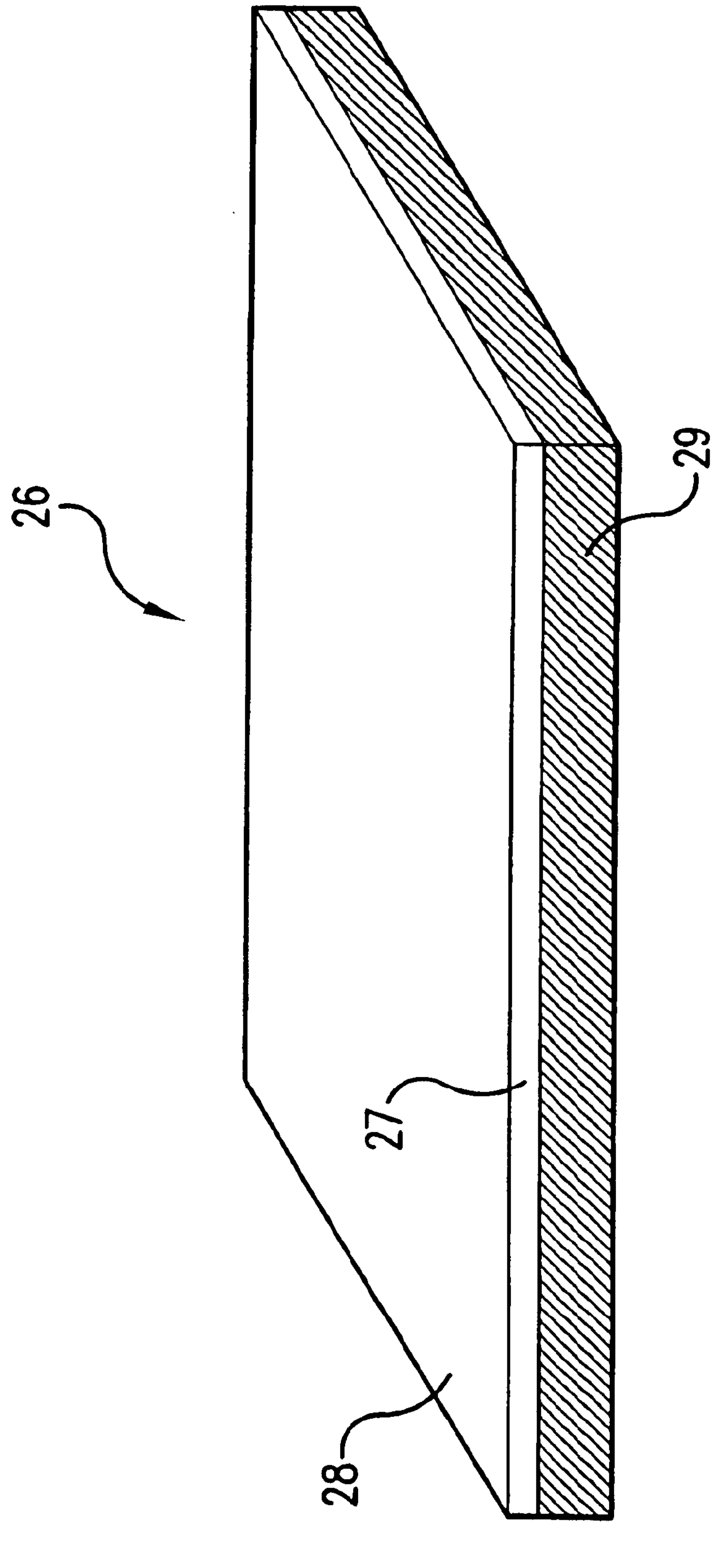
FIG. 27 illustrates another alternative embodiment for a tacky surface in accordance with the principles of the present invention.

FIG. 27 illustrates another embodiment wherein the material that presents the top exposed tacky surface has a substantially uniform composition. The material comprises a blend of materials that are tacky when dry with materials that are tacky when wet. The tacky-when-wet materials include certain hydrocolloid gums (e.g., gaur gum, locust bean gum, and the like). Since these hydrocolloid gums have a large capacity for absorbing moisture, they should provide good wet adhesive or tackiness. The tacky-when-dry materials, which are also pressure-sensitive, could include synthetic and/or natural rubbers in the presence of plasticizers. The synthetic and/or natural rubbers could be, for example, polyisobutylenes, natural rubber, silicone rubbers, acrylonitrile rubbers, polyurethane rubbers, butyl rubber elastomer, and the like.

The strength and uniformity of a blend of tacky-when-wet and tacky-when-dry materials as described above could be increased by the introduction of a cohesive strengthening agent to the blend. The cohesive strengthening agent could, for example, be one or more of natural and artificial fibrous materials such as wood cellulose, cotton, or Dacron.

In FIG. 27, a top layer 27 of a multi-layer assembly 26 comprises a blend of pressure-sensitive dry adhesive with a hydrocolloid gum, mixed with a cohesive strengthening agent. Due to the cohesive strengthening agent, a surface 28 of the top layer 27 has a uniform appearance of a single material. A bottom layer 29 is a wear-resistant anti-skid layer for contacting a floor. The bottom layer 29 might not be present if the layer 27 is being used as an insert.

Any of the materials that present a top exposed tacky surface that is tacky both when wet and when dry as described above could be used in combination with each other, or in combination with any of the other layers described. For example, either of layers 18 or 27 could be used in combination with a hydrophobic layer and a hydrophilic layer.

As described previously, in an embodiment, the floor mat includes a tacky surface having a top exposed surface with a surface area and a substantially non-paper anti-slip component disposed within the surface area of the top exposed surface of the tacky surface to prevent slipping on the tacky surface when wet. Thus, the anti-slip component is in operable association with the top exposed surface of the tacky surface to reduce slippage of a person on the top exposed surface who steps on the top exposed surface when the top exposed surface is wet. The anti-slip component may be integrally included in the top exposed surface.

The anti-slip component may include a plurality of channels as can be seen in FIG. 5 which are comprised of a non-tacky material where the plurality of channels is extendible from the top surface of the tacky surface in response to a person stepping on the tacky surface. Alternatively, the floor mat may include an anti-slip component that is extendible from the top surface of the tacky surface in the absence of a person standing on the tacky surface, such as the treads described previously. Thus, the treads may be elongated members that have a length extending across the top exposed surface of the tacky surface which is substantially greater than a height that the treads extend above the top exposed surface of the tacky surface.

Additionally, the anti-slip component may be the apertures illustrated in FIG. 11.

The various embodiments for an anti-slip component may be comprised of a non-tacky material, e.g., non-tacky members, and a water resistant material. Thus, the anti-slip components may be water resistant. The anti-slip components may also be comprised of a material such that they remain functional to prevent slipping on the tacky surface after a plurality of uses. As such, the anti-slip component may be comprised of a sufficiently rigid material such that a configuration of the anti-slip component is substantially maintained after being stepped on a plurality of times by a person and may be comprised of a material having a composition which is substantially maintained after having been stepped on a plurality of times by the person.

As was also described previously, in an embodiment, the floor mat includes a base portion having a non-tacky exposed top surface area 250 for contacting the soles of a person's shoes thereon and a tacky portion associated with the non-tacky exposed top surface area of the base portion and having a tacky exposed top surface area 350 for contacting the soles of the shoes thereon. As can be seen at least in FIG. 1, the base portion non-tacky exposed top surface area 250 is at least as large as the tacky portion tacky exposed top surface area 350.

The floor mat's base portion may include a cushioning component such that when the person's shoes applies pressure to the base portion and the tacky portion, both the base portion and the tacky portion conform to a topography of a bottom of the person's shoes. The tacky portion may also include a tacky surface on a bottom side of the tacky portion.

In various embodiments, the base portion may circumscribe the tacky portion, as can be seen in FIG. 1, or may be located adjacent to the tacky portion, as can be seen in FIG. 14.

As can also be seen in at least FIG. 1, the floor mat has a base portion that has a continuous non-tacky exposed top surface area 250 for contacting the soles of a person's shoes thereon and a tacky portion having a tacky exposed top surface area 350 for contacting the soles of the shoes thereon. As can be seen also in FIGS. 15 and 16, the non-tacky exposed top surface area of the base portion and the tacky exposed top surface area of the tacky portion are both of a size such that an entire sole of an adult-sized shoe is receivable thereon. The continuous non-tacky exposed top surface area 250 of the base portion has a first side area 252 disposed on a first side 352 of the tacky exposed top surface area of the tacky portion and a second side area 254 disposed on a second, opposing side 354 of the tacky exposed top surface area of the tacky portion. The first side area of the continuous non-tacky exposed top surface area of the base portion is larger than the second side area of the continuous non-tacky exposed top surface area of the base portion.

All of the disclosed embodiments are illustrative of the various ways in which the present invention may be practiced. Additionally, any of the disclosed embodiments for the components of the floor mat, e.g., the base portion, the tacky portion, the graphic display, and thus all of the features associated with these components, may be combined in any embodiment of the present invention and the present invention is not limited to only the particular combined embodiments disclosed. Other embodiments can be implemented by those skilled in the art without departing from the spirit and scope of the present invention.

What is claimed is:

1. A floor mat comprising a top exposed tacky surface, wherein said top exposed tacky surface is formed by combining a first adhesive composition that is tacky when dry with a second adhesive composition that is tacky when wet.

2. The floor mat of claim 1, further comprising an anti-slip component that is a separate structural member from said top exposed tacky surface.

3. The floor mat of claim 2, wherein said anti-slip component is a tread.

4. The floor mat of claim 3, wherein said top exposed tacky surface includes an aperture therein and wherein said tread extends through said aperture.

5. The floor mat of claim 3, wherein said tread extends above said top exposed tacky surface.

6. The floor mat of claim 3, wherein said tread extends from a surface of a member disposed under said top exposed tacky surface.

7. The floor mat of claim 3, wherein said tread is an elongated member that has a length extending across said top exposed tacky surface which is substantially greater than a height that said tread extends above said top exposed tacky surface.

8. The floor mat of claim 3, wherein said tread includes a plurality of grooves along the length of the tread.

9. The floor mat of claim 3, wherein said tread is water resistant.

10. The floor mat of claim 2, wherein said anti-slip component remains functional to prevent slipping on said top exposed tacky surface after a plurality of uses.

11. A floor mat of claim 1, wherein a material that presents said top exposed tacky surface comprises a plurality of material domains such that a combination of said domains is tacky both when dry and when wet.

12. The floor mat of claim 11, wherein said plurality of material domains constitutes at least a portion of a top layer of said floor mat, and wherein said floor mat further comprises a non-tacky hydrophobic layer adjacent to said top layer and a hydrophilic layer adjacent to said hydrophobic layer.

13. The floor mat of claim 12, wherein said floor mat further comprises a wear-resistant anti-skid layer for contacting a floor.

14. The floor mat of claim 11, wherein said plurality of material domains includes a tacky pressure-sensitive domain, a non-tacky hydrophobic domain, and a hydrophilic domain.

15. A floor mat of claim 1, wherein said first and second adhesive compositions are arranged in a pattern of alternating regions.

16. The floor mat of claim 15, wherein said first adhesive composition is pressure-sensitive.

17. The floor mat of claim 15, wherein said second adhesive composition includes at least one of natural and synthetic rubbers.

18. The floor mat of claim 15, wherein said alternating regions constitute at least a portion of a top layer of said floor mat, and wherein said floor mat further comprises at least a wear-resistant anti-skid layer for contacting a floor.

19. The floor mat of claim 1, wherein a material presenting said top exposed tacky surface has a uniform composition.

20. The floor mat of claim 19, wherein said uniform composition includes pressure-sensitive adhesives coated with hydrophilic monomers.

21. The floor mat of claim 19, wherein said uniform composition includes pressure-sensitive adhesives mixed with hydrocolloid gums.

22. The floor mat of claim 21, wherein said uniform composition further includes a cohesive agent.

23. The floor mat of claim 1, wherein said floor mat is embossed with a pattern.

24. The floor mat of claim 1, wherein said floor mat is perforated.

25. A floor mat comprising:

a top layer comprising a plurality of material domains such that a combination of said domains is tacky both when dry and when wet;

a non-tacky hydrophobic layer adjacent to said top layer;

a hydrophilic layer adjacent to said hydrophobic layer; and a wear-resistant anti-skid layer for contacting a floor.

26. A floor mat comprising:

a top layer comprising alternating regions of a first adhesive composition that is tacky when dry, and a second adhesive composition that is tacky when wet; and a wear-resistant anti-skid layer for contacting a floor.

27. A floor mat comprising:

a top layer of material which is tacky when dry;

a second layer of material adjacent to said top layer, said second layer being tacky when wet; and a wear-resistant anti-skid layer for contacting a floor;

wherein said top layer has holes for allowing a surface to be cleaned to contact said second layer while also contacting said top layer.

28. The floor mat of claim 27, wherein said second layer is hydrophilic.

29. A floor mat comprising:

a top layer comprising a plurality of materials blended to produce a uniform texture, wherein at least a first of said plurality of materials is a pressure-sensitive dry adhesive, and at least a second of said plurality of materials is a hydrocolloid gum; and a wear-resistant anti-skid layer for contacting a floor.

30. A floor mat comprising an exposed tacky top surface for the cleaning of a person's shoes, said exposed tacky top surface being porous to allow water coming in contact therewith to at least one of drain, dissipate and be absorbed through said exposed top tacky surface.

31. A floor mat comprising a tacky portion with a water dissipating capability.

32. A floor mat comprising a tacky portion with a water drainage capability.

33. A floor mat comprising a tacky portion with a water absorbing capability.

34. A floor mat comprising a tacky portion with at least one of a water dissipating capability, a water drainage capability, and a water absorbing capability.

35. A floor mat comprising an exposed tacky top surface, said exposed tacky top surface being porous to allow water coming in contact therewith to at least one of drain, dissipate and be absorbed through said exposed top tacky surface.

36. The floor mat of claim 35, wherein a material that presents said top exposed tacky surface comprises a plurality of material domains such that a combination of said domains is tacky both when dry and when wet.

37. The floor mat of claim 36, wherein said plurality of material domains includes a tacky pressure-sensitive domain, a non-tacky hydrophobic domain, and a hydrophilic domain.

38. The floor mat of claim 35, wherein a material presenting said top exposed tacky surface has a uniform composition.

39. A floor mat having an exposed top surface, wherein said exposed top surface is tacky, porous to water, and contains a material component for absorbing water.

40. The floor mat of claim 31, said tacky portion including a plurality of tacky layers, and the floor mat further comprising a base portion adapted to support said tacky portion thereon.

41. The floor mat of claim 31, said tacky portion having an anti-slip component associated therewith to prevent slipping thereon when wet.

42. The floor mat of claim 41, wherein said anti-slip component includes an aperture defined through a top tacky exposed surface of said tacky portion.

43. The floor mat of claim 31, wherein said tacky portion includes a porous material.

44. The floor mat of claim 32, said tacky portion including a plurality of tacky layers, and the floor mat further comprising a base portion adapted to support said tacky portion thereon.

45. The floor mat of claim 32, said tacky portion having an anti-slip component associated therewith to prevent slipping thereon when wet.

46. The floor mat of claim 45, wherein said anti-slip component includes an aperture defined through a top tacky exposed surface of said tacky portion.

47. The floor mat of claim 32, wherein said tacky portion includes a porous material.

48. The floor mat of claim 33, said tacky portion including a plurality of tacky layers, and the floor mat further comprising a base portion adapted to support said tacky portion thereon.

49. The floor mat of claim 33, said tacky portion having an anti-slip component associated therewith to prevent slipping thereon when wet.

50. The floor mat of claim 49, wherein said anti-slip component includes an aperture defined through a top tacky exposed surface of said tacky portion.

51. The floor mat of claim 33, wherein said tacky portion includes a porous material.

52. The floor mat of claim 33, wherein said tacky portion includes a hydrophilic material.

* * * * *